(12) United States Patent
Steiner, III et al.

(10) Patent No.: US 8,865,109 B2
(45) Date of Patent: *Oct. 21, 2014

(54) SYSTEMS AND METHODS RELATED TO THE FORMATION OF CARBON-BASED NANOSTRUCTURES

(75) Inventors: Stephen A. Steiner, III, Cambridge, MA (US); Brian L. Wardle, Lexington, MA (US)

(73) Assignee: Massachusetts Institute of Technology, Cambrige, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,398

(22) Filed: Aug. 7, 2012

(65) Prior Publication Data
US 2013/0058859 A1 Mar. 7, 2013

Related U.S. Application Data

(63) Continuation of application No. 12/847,905, filed on Jul. 30, 2010, now Pat. No. 8,257,678.

(60) Provisional application No. 61/230,267, filed on Jul. 31, 2009.

(51) Int. Cl.
| | |
|---|---|
| *D01C 5/00* | (2006.01) |
| *C01B 31/02* | (2006.01) |
| *B82Y 30/00* | (2011.01) |
| *C01B 31/04* | (2006.01) |
| *B82Y 40/00* | (2011.01) |

(52) U.S. Cl.
CPC ......... *C01B 31/0453* (2013.01); *C01B 31/0233* (2013.01); *C01B 31/0293* (2013.01); *B82Y 30/00* (2013.01); *B82Y 40/00* (2013.01); *Y10S 977/742* (2013.01); *Y10S 977/842* (2013.01); *Y10S 977/843* (2013.01)
USPC ............... 423/447.3; 423/447.1; 977/742; 977/842; 977/843

(58) Field of Classification Search
USPC ........ 423/443.3, 443.1, 445 B; 977/742, 743, 977/842, 843
See application file for complete search history.

(56) References Cited

U.S. PATENT DOCUMENTS

| | | | | |
|---|---|---|---|---|
| 7,459,013 | B2 * | 12/2008 | Holmes et al. | .......... 96/132 |
| 7,537,825 | B1 | 5/2009 | Wardle et al. | |

(Continued)

FOREIGN PATENT DOCUMENTS

| | | |
|---|---|---|
| JP | 2004-324004 A | 11/2004 |
| WO | WO 2007/088829 A1 | 8/2007 |

(Continued)

OTHER PUBLICATIONS

On the Graphitization Nature of Oxides for the Formation of Carbon Nanostructures M. H. Rümmeli,*, C. Kramberger, A. Grüneis, P. Ayala, T. Gemming, B. Büchner, and, and T. Pichler Chemistry of Materials 2007 19 (17), 4105-4107.*

(Continued)

*Primary Examiner* — Richard M Rump
(74) *Attorney, Agent, or Firm* — Wolf, Greenfield & Sacks, P.C.

(57) ABSTRACT

Systems and methods for the formation of carbon-based nanostructures are generally described. In some embodiments, the nanostructures may be formed on a nanopositor. The nanopositor can comprise, in some embodiments, at least one of metal atoms in a non-zero oxidation state and metalloid atoms in a non-zero oxidation state. For example, the nanopositor may comprise a metal oxide, a metalloid oxide, a metal chalcogenide, a metalloid chalcogenide, and the like. The carbon-based nanostructures may be grown by exposing the nanopositor, in the presence or absence of a growth substrate, to a set of conditions selected to cause formation of carbon-based nanostructures on the nanopositor. In some embodiments, metal or metalloid atoms in a non-zero oxidation state are not reduced to a zero oxidation state during the formation of the carbon-based nanostructures. In some cases, metal or metalloid atoms in a non-zero oxidation state do not form a carbide during the formation of the carbon-based nanostructures.

21 Claims, 17 Drawing Sheets

(56) References Cited

U.S. PATENT DOCUMENTS

| | | |
|---|---|---|
| 2005/0025696 A1* | 2/2005 | Resasco et al. ............ 423/447.3 |
| 2007/0090489 A1 | 4/2007 | Hart et al. |
| 2007/0218202 A1* | 9/2007 | Ajayan et al. .............. 427/249.1 |
| 2008/0075954 A1 | 3/2008 | Wardle et al. |
| 2008/0187648 A1 | 8/2008 | Hart et al. |
| 2009/0008610 A1 | 1/2009 | Bordere et al. |
| 2009/0117363 A1 | 5/2009 | Wardle et al. |
| 2009/0196993 A1 | 8/2009 | Iijima et al. |
| 2009/0291352 A1 | 11/2009 | Oshihara et al. |
| 2009/0311166 A1 | 12/2009 | Hart et al. |
| 2010/0196695 A1 | 8/2010 | Garcia et al. |
| 2010/0255303 A1 | 10/2010 | Wardle et al. |

FOREIGN PATENT DOCUMENTS

| | | |
|---|---|---|
| WO | WO 2008/057620 A2 | 5/2008 |
| WO | WO 2007/139038 | 11/2009 |

OTHER PUBLICATIONS

Randall L Vander Wal, Thomas M Ticich, Comparative flame and furnace synthesis of single-walled carbon nanotubes, Chemical Physics Letters, vol. 336, Issues 1-2, Mar. 9, 2001, pp. 24-32, ISSN 0009-2614, 10.1016/S0009-2614(01)00114-2.*

Jasso, P. et al. "Nanostructured Carbon on Steam Reforming Catalysts". Journal of New Materials for Electrochemical Systems 11, 95-98 (2008).*

Ferlauto, A. S., et al. "Chemical vapor deposition of multi-walled carbon nanotubes from nickel/yttria-stabilized zirconia catalysts". Applied Physics A. Aug. 2006, vol. 84, Issue 3, pp. 271-276.*

Diameter-Controlled Synthesis of Discrete and Uniform-Sized Single-Walled Carbon Nanotubes Using Monodisperse Iron Oxide Nanoparticles Embedded in Zirconia Nanoparticle Arrays as Catalysts Sangjin Han,Taekyung Yu,Jongnam Park,Bonil Koo,Jin Joo, and, Taeghwan Hyeon, Seunghun Hong and, and Jiwoon Im The Journal of Physical Chemistry B 2004 108 (2.*

Fazaneh, F., and N. Faal Hamedani. "Preparation of carbon nanotubes by CVD process over nanoparticles of Ni—Ce—Zr mixed oxides." J. Sci. Islam. Repub. Iran 19.2 (2008): 119-123.*

International Search Report and Written Opinion, dated Jan. 24, 2011 in PCT/US2010/002135.

Chinese Office Action for Application No. CN 201080041244.4 mailed Oct. 8, 2013.

Fang et al., CVD synthesis of CNTs using bimetal catalyst with different atomic ratio supported on ZrO2. Journal Zhejiang University of Technology. Feb. 28, 2005;33(1):88-92.

* cited by examiner

SYSTEMS AND METHODS RELATED TO THE FORMATION OF CARBON-BASED NANOSTRUCTURES

RELATED APPLICATIONS

This application is a continuation of U.S. application Ser. No. 12/847,905, filed Jul. 30, 2010, entitled "Systems and Methods Related to the Formation of Carbon-Based Nanostructures," by Steiner, et al., which claims the benefit of U.S. Provisional Patent Application Ser. No. 61/230,267, filed Jul. 31, 2009, entitled "Systems and Methods Related to the Formation of Carbon-Based Nanostructures," by Steiner, et al., each of which is incorporated herein by reference in its entirety for all purposes.

FIELD OF INVENTION

Systems and methods for the formation of carbon-based nanostructures are generally described.

BACKGROUND

The production of carbon-based nanostructures may potentially serve as an important tool in the production of emerging electronics and structural materials. Recent research has focused on the production of, for example, carbon nanotubes (CNTs) through chemical vapor deposition (CVD) and other techniques. The selection of an appropriate material on which to form the nanostructures is important when designing processes for the production of carbon nanostructures. However, many commonly used materials have one or more disadvantages associated with them. Some materials may react with the substrate on which they are deposited, which can both degrade the substrate over time and reduce or eliminate nanostructure growth. Because of their reactivity, commonly used nanostructure catalysts such as Fe, Co, and Ni must often be stabilized or isolated to enable CNT growth, thereby limiting the applications in which they may be used.

Accordingly, improved compositions and methods are needed.

SUMMARY OF THE INVENTION

Systems and methods for the formation of carbon-based nanostructures are generally described. The subject matter of the present invention involves, in some cases, interrelated products, alternative solutions to a particular problem, and/or a plurality of different uses of one or more systems and/or articles.

In one aspect, a method of growing carbon nanotubes is described. The method can comprise, in one set of embodiments, exposing a carbon nanotube precursor to a nanopositor comprising a zirconium oxide under conditions causing the formation of carbon nanotubes on the nanopositor.

In some instances, the method can comprise exposing a carbon nanotube precursor to a nanopositor comprising at least one of metal atoms in a non-zero oxidation state and metalloid atoms in a non-zero oxidation state under conditions causing the formation of carbon nanotubes on the nanopositor. In some cases, the nanopositor can be in contact with a portion of a growth substrate comprising a material that is different from the nanopositor. In some embodiments, fewer than about 2% of the at least one of metal atoms in a non-zero oxidation state and metalloid atoms in a non-zero oxidation state are reduced to a zero oxidation state during the formation of the carbon nanotubes. In some cases, fewer than about 2% of the at least one of metal atoms in a non-zero oxidation state and metalloid atoms in a non-zero oxidation state form a carbide during the formation of the carbon nanotubes.

In some cases, the method can comprise exposing a carbon nanotube precursor to a nanopositor comprising at least one of metal atoms in a non-zero oxidation state and metalloid atoms in a non-zero oxidation state under conditions causing the formation of carbon nanotubes on the nanopositor, wherein formation of the carbon nanotubes occurs in the absence of a growth substrate in contact with the nanopositor. In some embodiments, fewer than about 2% of the at least one of metal atoms in a non-zero oxidation state and metalloid atoms in a non-zero oxidation state are reduced to a zero oxidation state during the formation of the nanostructures, and fewer than about 2% of the at least one of metal atoms in a non-zero oxidation state and metalloid atoms in a non-zero oxidation state form a carbide during the formation of the nanostructures.

In one set of embodiments, the method can comprise exposing a carbon nanotube precursor to a nanopositor comprising at least one of metal atoms in a non-zero oxidation state and metalloid atoms in a non-zero oxidation state under conditions causing the formation of carbon nanotubes on the nanopositor, wherein fewer than about 2% of the at least one of metal atoms in a non-zero oxidation state and metalloid atoms in a non-zero oxidation state are reduced to a zero oxidation state during the formation of the nanostructures. In some cases, fewer than about 2% of the at least one of metal atoms in a non-zero oxidation state and metalloid atoms in a non-zero oxidation state form a carbide during the formation of the nanostructures.

In one aspect, a method of growing carbon-based nanostructures is described. The method can comprise, in some instances, exposing a solid carbon-based nanostructure precursor to a nanopositor comprising at least one of metal atoms in a non-zero oxidation state and metalloid atoms in a non-zero oxidation state under conditions causing the formation of carbon-based nanostructures.

In some instances, the method can comprise exposing a carbon-based nanostructure precursor to a nanopositor comprising at least one of metal atoms in a non-zero oxidation state and metalloid atoms in a non-zero oxidation state under conditions causing the formation of carbon-based nanostructures, wherein, the nanopositor is in contact with a growth substrate. In some cases, less than about 50 atomic % of the nanopositor diffuses into or chemically reacts with the growth substrate, and the growth substrate diffuses into less than about 50 atomic % of the nanopositor during formation of the carbon nanostructures.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
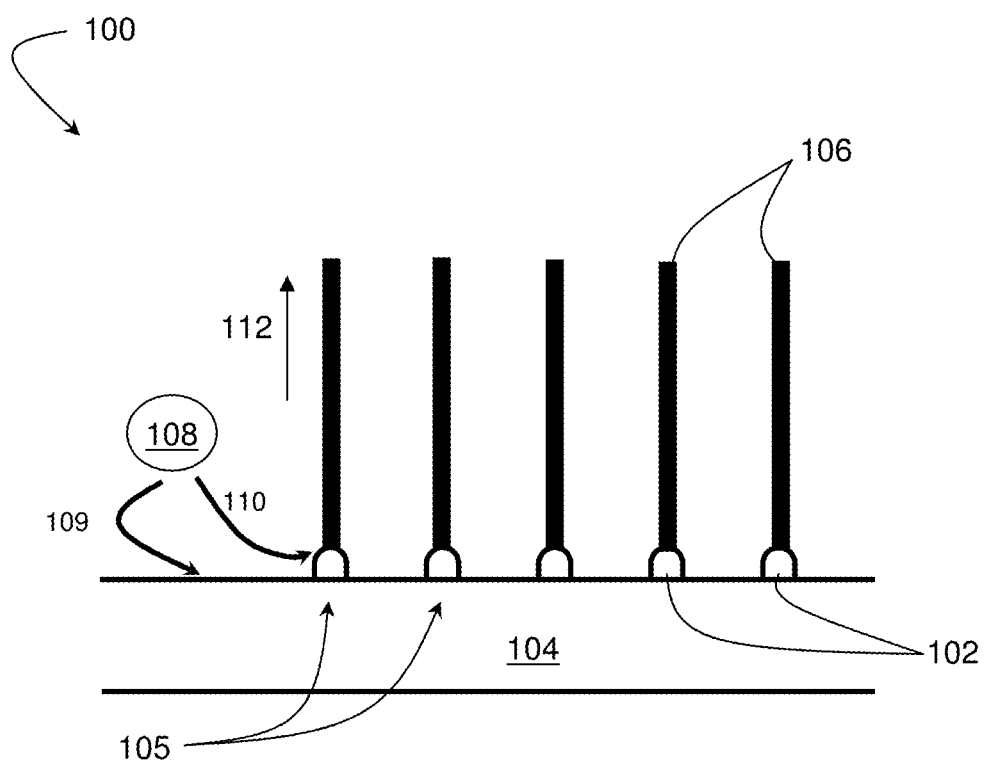
FIGS. 1A-1B include schematic illustrations of nanostructure growth wherein a growth substrate is employed, according to one set of embodiments.

Systems and methods for the formation of carbon-based nanostructures are generally described. In some embodiments, the nanostructures may be formed on a nanopositor. The nanopositor can comprise, in some embodiments, at least one of metal atoms in a non-zero oxidation state and metalloid atoms in a non-zero oxidation state. For example, the nanopositor may comprise a metal oxide, a metalloid oxide, a metal chalcogenide, a metalloid chalcogenide, and the like. The carbon-based nanostructures may be grown by exposing the nanopositor, in the presence or absence of a growth substrate, to a set of conditions selected to cause formation of carbon-based nanostructures on the nanopositor. In some embodiments, metal or metalloid atoms in a non-zero oxidation state are not reduced to a zero oxidation state during the formation of the carbon-based nanostructures. In some cases, metal or metalloid atoms in a non-zero oxidation state do not form a carbide during the formation of the carbon-based nanostructures.

In some embodiments, the systems and methods described herein may be particularly suited for forming carbon nanotubes. In some instances, conditions are selected such that carbon nanotubes are selectively produced. In many cases, conditions (e.g., temperature, pressure, etc.) that lead to the production of other carbon-based nanostructures, such as graphene, cannot be successfully used to produce nanotubes. In some cases, carbon nanotubes will not grow on traditional nanopositors from which graphene will grow.

In one set of embodiments, the nanopositors described herein, in combination with other processing conditions (e.g., temperature, pressure, etc.), can be used to form carbon-based nanostructures from solid precursors. Traditionally, carbon-based nanostructures have been formed from non-solid nanostructure precursors (e.g., gases, liquids, plasmas, etc.). The process for forming carbon-based nanostructures from solid precursors is fundamentally different from the process for forming carbon-based nanostructures from non-solid precursors. The inventors have unexpectedly discovered, however, that such differences can be overcome to form carbon-based nanostructures from solids.

As used herein, the term "nanopositor" refers to a material that, when exposed to a set of conditions selected to cause formation of nanostructures, either enables formation of nanostructures that would otherwise not occur in the absence of the nanopositor under essentially identical conditions, or increases the rate of formation of nanostructures relative to the rate that would be observed under essentially identical conditions but without the nanopositor material. "Essentially identical conditions," in this context, means conditions that are similar or identical (e.g., pressure, temperature, composition and concentration of species in the environment, etc.), other than the presence of the nanopositor. In one set of embodiments, a "nanopositor" is not consumed in a reaction involving the formation of nanostructures which it enables or for which it increases the rate, i.e., atoms or molecules that make up the nanopositor are not, via reaction, incorporated into the nanostructure.

The nanopositors described herein may possess advantages compared to other materials. For example, the nanopositors described herein can be capable of promoting nanostructure growth on challenging substrates, such as carbon, metals, and ceramics. Unlike commonly used materials such as zero-oxidation state iron, cobalt, and nickel, which may react with substrates such as carbon at relatively high temperatures (e.g., at least about 500° C.), the nanopositors comprising metal or metalloid atoms in a non-zero oxidation state may be relatively non-reactive at such elevated temperatures. In addition, the nanopositors comprising metal or metalloid atoms in a non-zero oxidation state (e.g., zirconium oxide, etc.) may be relatively inexpensive compared to many other materials that have been used for nanostructure growth, such as gold, platinum, and rhenium. The nanopositors described herein may also be resistant to oxide formation. In some embodiments, the poisoning mechanism of the nanopositors comprising metal or metalloid atoms in a non-zero oxidation state may be different than the poisoning mechanism observed in other nanopositors (e.g., zero-oxidation state metal catalysts) used in nanostructure growth. Indeed, in some embodiments, substantially no poisoning of the nanopositor occurs during nanostructure growth. This could allow more efficient growth and possibly the growth of nanostructures with nearly unlimited dimensions.

The use of zirconium oxide nanopositors may be particularly advantageous, in some cases. In addition to the advantages outlined above, zirconium and zirconium oxide can be processed relatively easily. In some cases, nanopositors comprising zirconium oxide can be easily removed from the nanostructures once they are grown, relative to traditional nanostructure growth materials (e.g., metals, etc.). Zirconium forms stable oxides relatively easily. In addition, zirconium is capable of forming a metastable oxygen-deficient state, which has been shown to be particularly active in forming certain types of nanostructures such as, for example, carbon nanotubes. Zirconium oxide is generally not as susceptible as non-oxides to oxidation, since it is already an oxide, and thus may be an advantageous nanopositor for oxidative nanostructure growth conditions (e.g., growth that involves water, alcohol(s), etc.). In addition, zirconium oxide may not undergo carbothermic reduction at high temperatures (e.g., up to 1050° C.), and thus, may also be resistant to poisoning by carburization, which has been hypothesized to be a carbon nanotube growth termination mechanism for iron. Thus, zirconium oxide may be particularly useful in forming nanostructures on substrates that comprise carbon, in some embodiments.

Additional advantages of the systems and methods associated with nanostructure growth using nanopositors comprising metal or metalloid atoms in a non-zero oxidation state are described in more detail below.

The articles, systems, and methods described herein may be combined with those described in International Patent Application Serial No. PCT/US2007/011914, filed May 18, 2007, entitled "Continuous Process for the Production of Nanostructures Including Nanotubes," published as WO 2007/136755 on Nov. 29, 2007; International Patent Application Serial No. PCT/US07/11913, filed May 18, 2007, entitled "Nanostructure-reinforced Composite Articles and Methods," published as WO 2008/054541 on May 8, 2008; International Patent Application Serial No. PCT/US2008/009996, filed Aug. 22, 2008, entitled "Nanostructure-reinforced Composite Articles and Methods," published as WO 2009/029218 on Mar. 5, 2009; U.S. Pat. No. 7,537,825, issued on May 26, 2009, entitled "Nano-Engineered Material Architectures: Ultra-Tough Hybrid Nanocomposite System;" U.S. patent application Ser. No. 11/895,621, filed Aug. 24, 2007, entitled "Nanostructure-Reinforced Composite Articles," published as U.S. Patent Application Publication No. 2008/0075954 on Mar. 27, 2008; U.S. patent application Ser. No. 12/618,203, filed Nov. 13, 2009, entitled "Controlled-Orientation Films and Nanocomposites Including Nanotubes or Other Nanostructures;" and U.S. patent application Ser. No. 12/630,289, filed Dec. 3, 2009, entitled "Multifunctional Composites Based on Coated Nanostructures;" each of which is incorporated herein by reference in its entirety for all purposes.

Examples of systems and methods for growing carbon-based nanostructures using nanopositors comprising metal or metalloid atoms in a non-zero oxidation state are now provided.

In one aspect, methods for growing carbon-based nanostructures are provided. As used herein, the term "carbon-based nanostructure" refers to articles having a fused network of aromatic rings, at least one cross-sectional dimension of less than about 1 micron, and comprising at least about 30% carbon by mass. In some embodiments, the carbon-based nanostructures may comprise at least about 40%, at least about 50%, at least about 60%, at least about 70%, at least about 80%, at least about 90%, or at least about 95% of carbon by mass, or more. The term "fused network" might not include, for example, a biphenyl group, wherein two phenyl rings are joined by a single bond and are not fused. Example of carbon-based nanostructures include carbon nanotubes (e.g., single-walled carbon nanotubes, double-walled carbon nanotubes, multi-walled carbon nanotubes, etc.), carbon nanowires, carbon nanofibers, carbon nanoshells, graphene, fullerenes, and the like.

In some embodiments, a carbon-based nanostructure may have a least one cross-sectional dimension of less than about 500 nm, less than about 250 nm, less than about 100 nm, less than about 75 nm, less than about 50 nm, less than about 25 nm, less than about 10 nm, or, in some cases, less than about 1 nm. Carbon-based nanostructures described herein may have, in some cases, a maximum cross-sectional dimension of less than about 1 micron, less than about 500 nm, less than about 250 nm, less than about 100 nm, less than about 75 nm, less than about 50 nm, less than about 25 nm, less than about 10 nm, or, in some cases, less than about 1 nm.

In some embodiments, the carbon-based nanostructures described herein may comprise carbon nanotubes. As used herein, the term "carbon nanotube" is given its ordinary meaning in the art and refers to a substantially cylindrical molecule or nanostructure comprising a fused network of primarily six-membered rings (e.g., six-membered aromatic rings) comprising primarily carbon atoms. In some cases, carbon nanotubes may resemble a sheet of graphite formed into a seamless cylindrical structure. It should be understood that the carbon nanotube may also comprise rings or lattice structures other than six-membered rings. Typically, at least one end of the carbon nanotube may be capped, i.e., with a curved or nonplanar aromatic structure. Carbon nanotubes may have a diameter of the order of nanometers and a length on the order of millimeters, or, on the order of tenths of microns, resulting in an aspect ratio greater than 100, 1000, 10,000, 100,000, $10^6$, $10^7$, $10^8$, $10^9$, or greater. Examples of carbon nanotubes include single-walled carbon nanotubes (SWNTs), double-walled carbon nanotubes (DWNTs), multi-walled carbon nanotubes (MWNTs) (e.g., concentric carbon nanotubes), inorganic derivatives thereof, organic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the carbon nanotube comprises a multi-walled or single-walled carbon nanotube with an inner diameter wider than is attainable from a traditional catalyst or other nanopositor material. In some cases, the carbon nanotube may have a diameter less than about 1 micron, less than about 500 nm, less than about 250 nm, less than about 100 nm, less than about 50 nm, less than about 25 nm, less than about 10 nm, or, in some cases, less than about 1 nm.

In one set of embodiments, a method of growing carbon-based nanostructures comprises exposing a nanopositor comprising metal or metalloid atoms in a non-zero oxidation state to a set of conditions selected to cause formation of carbon-based nanostructures on the nanopositor. The term "oxidation state" refers to the standard adopted by the International Union of Pure and Applied Chemistry (IUPAC) as described in the "IUPAC Compendium of Chemical Terminology," Second Edition (1997), which is incorporated herein by reference in its entirety.

An exemplary system 100 for growing carbon-based nanostructures is shown in FIG. 1A. Nanopositor 102 (e.g., a nanopositor nanoparticle, as described below) comprising metal or metalloid atoms in a non-zero oxidation state is positioned on the surface of growth substrate 104. In some cases, the nanopositor is in contact with a portion of the growth substrate comprising a material that is different from the nanopositor (e.g., the portion of the nanopositor in contact with the growth substrate). In some cases the nanopositor is in contact with a portion of the growth substrate comprising a material that is the same as the nanopositor (e.g., the portion of the nanopositor in contact with the growth substrate). The nanopositor and/or one or more portions 105 of the growth substrate in contact with a nanopositor may be exposed to a set of conditions selected to cause formation of nanostructures on the nanopositor, and nanostructures 106 may grow from nanopositor 102.

In some cases, a nanostructure precursor material is used to grow nanostructures. For example, in FIG. 1A, nanostructure precursor material 108, may be delivered to growth substrate 104 and contact or permeate the growth substrate surface (e.g., via arrow 109), the nanopositor surface, and/or the interface between the nanopositor and the growth substrate (e.g., via arrow 110). Nanostructure precursor materials may be in any suitable phase (e.g., solid, liquid, or gas) and include, for example, hydrocarbons (e.g., methane, ethylene, acetylene, etc.), alcohols, and the like. In the growth of carbon nanotubes, for example, the nanostructure precursor material may comprise carbon, such that carbon dissociates from the precursor molecule and may be incorporated into the growing carbon nanotube, which is pushed upward from the growth substrate in general direction 112 with continued growth. Those of ordinary skill in the art would be able to select the appropriate nanostructure precursor material for the growth of a particular nanostructure. For example, carbon nanotubes may be synthesized by reaction of a $C_2H_4/H_2$ mixture with a nanopositor, such as nanoparticles of zirconium oxide arranged on a carbon fiber support. Other examples of nanostructure precursor materials that may be used include, for example, methane, ethanol, methyl formate, acetylene, and other alkynes. Examples of suitable nanostructure fabrication techniques are discussed in more detail in International Patent Application Serial No. PCT/US2007/011914, filed May 18, 2007, entitled "Continuous Process for the Production of Nanostructures Including Nanotubes," published as WO 2007/136755 on Nov. 29, 2007, which is incorporated herein by reference in its entirety.

In one set of embodiments, the nanostructure precursor material comprises a solid. Examples of solid precursor materials include, for example, coal, coke, amorphous carbon, unpyrolyzed organic polymers (e.g., phenol-formaldehyde, resorcinol-formaldehyde, melamine-formaldehyde, etc.), partially pyrolyzed organic polymers, diamond, graphene, graphite, or any other suitable solid form of carbon. In some embodiments, the solid precursor material may comprise at least about 25 wt % carbon, at least about 50 wt % carbon, at least about 75 wt % carbon, at least about 85 wt % carbon, at least about 90 wt % carbon, at least about 95 wt % carbon, at least about 98 wt % carbon, or at least about 99 wt % carbon.

In one set of embodiments, the nanostructure precursor material comprises both a solid and a non-solid (e.g., a liquid, a gas, etc.). For example, the nanostructure precursor material can comprise a solid form of carbon placed close to or in contact with the nanopositor material and a vapor-phase precursor material. As a specific example, the solid precursor component can be deposited on or near the nanopositor as soot, amorphous carbon, graphene, or graphite, and the nanopositor can be exposed to vapor comprising a hydrocarbon (e.g., methane, ethylene, acetylene, and the like). Not wishing to be bound by any particular theory, under some growth conditions, the presence of the solid precursor material can allow for nanostructure growth that might not occur in the absence of the solid precursor material. In some cases, the solid precursor material might provide a base from which the non-solid nanostructure precursor material can be added to grow the carbon-based nanostructure. For example, in some embodiments, a small portion of a carbon nanotube can be used as a starting material from which a larger nanotube can be grown using non-solid carbon nanostructure precursor material.

A variety of nanopositors comprising metal or metalloid atoms in a non-zero oxidation state can be used in the systems and methods described herein. In some cases, the nanopositor can comprise a crystalline material (e.g., a single-crystal material, a polycrystalline material, etc.), an amorphous material, or mixtures of these. In some embodiments, the nanopositor may comprise metal oxides or metal chalcogenides (e.g., metal sulfides, metal selenides, metal tellurides, etc.). In some embodiments, the nanopositor may comprise metalloid oxides or metalloid chalcogenides (e.g., metalloid sulfides, metalloid selenides, metalloid tellurides, etc.). In some cases, the nanopositor may comprise a metal and/or metalloid carbide, nitride, phosphide, silicide, or combination of these. Examples of metal atoms in a non-zero oxidation state which may be particularly suitable include, but are not limited to, oxide and chalcogenide forms of zirconium, hafnium, tantalum, niobium, yttrium, lanthanum, molybdenum, lanthanide metals, titanium, aluminum, rhenium, and calcium, among others. Examples of metalloid atoms in a non-zero oxidation state which may be particularly suitable include, but are not limited to, silicon, boron, and germanium, among others. The nanopositor may comprise, in some embodiments, metal or metalloid atoms that are non-carbidic (i.e., the metal or metalloid does not form a carbide, for example, under the conditions at which the carbon nanostructures are formed). In some embodiments, the nanopositor may comprise metal or metalloid atoms that do not form a carbide at temperatures up to 1050° C. In some embodiments, the nanopositor may comprise more than one oxide, more than one chalcogenide, or a combination of at least one oxide and at least one chalcogenide. For example, in some embodiments, the nanopositor may comprise zirconium oxide and molybdenum oxide, zirconium oxide and calcium oxide, or zirconium oxide an zirconium sulfide.

In some embodiments, a relatively large percentage of the metal or metalloid atoms in the nanopositor are in a non-zero oxidation state. For example, in some embodiments, at least about 25%, at least about 35%, at least about 50%, at least about 65%, at least about 75%, at least about 85%, at least about 95%, at least about 98%, at least about 99%, at least about 99.5%, at least about 99.9%, or more of the metal or metalloid atoms in the nanopositor are in a non-zero oxidation state. In some cases, substantially all of the metal or metalloid atoms in the nanopositor are in a non-zero oxidation state. The percentage of atoms with a specified oxidation state may be determined, for example, via X-ray photoelectron spectroscopy (XPS).

One or more dopant elements may be included in the nanopositor, in some embodiments. Examples of dopant elements that may be included in the nanopositor include, for example, Ca, Mg, Sr, Ba, Y, Mo, or other elements, or combinations of these and/or other elements. As a specific example, the nanopositor may comprise zirconium oxide doped with calcium (e.g., 1.5 atomic % calcium). In some cases, the nanopositor may comprise less than about 50 atomic %, less than about 35 atomic %, less than about 20 atomic %, less than about 10 atomic %, less than about 5 atomic %, less than about 2 atomic %, less than about 1.5 atomic %, less than about 1 atomic %, or less than about 0.5 atomic %, between about 0.1 atomic % and about 5 atomic %, between about 0.5 atomic % and about 3 atomic %, or between about 1 atomic % and about 2 atomic % dopant elements. The dopant element may, in some embodiments, be integrated into the nanopositor such that the dopant atoms reside within interstices of a crystalline material. In some cases, a dopant atom may replace an atom in the crystal structure of a nanopositor. Not wishing to be bound by any theory, the inclusion of dopant atoms in the nanopositor may have any one of the following benefits: enhancement of acidity, invocation of n-type or p-type doping, or acid-base pair formation on a surface of the nanopositor. In some cases, the dopant atoms may reside on one or more exterior surfaces of the nanopositor and/or within pores of the nanopositor. Dopant(s) can be applied to the nanopositor using a liquid precursor, in some instances. Dopant(s) can be added to the nanopositor, in some cases, using physical and/or chemical vapor deposition.

In some embodiments, the nanopositor is in contact with a portion of a growth substrate comprising a material that is different from the nanopositor. For example, in some cases, the nanopositor may comprise a metal oxide (e.g., a zirconium oxide), while the portion of the growth substrate in contact with the metal oxide comprises carbon, a metal, silicon, or any other suitable material that is not a metal oxide. As another example, the nanopositor may comprise a metalloid oxide (e.g., a silicon oxide), while the portion of the growth substrate in contact with the metalloid oxide comprises carbon, a metal, silicon, or any other suitable material that is not a metalloid oxide.

In some embodiments, the nanopositor is deposited on the substrate from a liquid containing nanopositor particles. Not wishing to be bound by any particular theory, the manner in which the nanopositor leaves the liquid and is deposited onto the substrate might enhance the activity of the nanopositor towards carbon nanostructure growth. For example, in some cases, an enhancement in nanopositor activity might occur due to clustering of a relatively large number of nanopositor particles. In some instances, an enhancement in nanopositor activity might arise due to a change in surface morphology of one or more nanopositor particles and/or due to a doping effect resulting from co-deposition of nanopositor particles and dopants from the liquid.

A plurality of nanopositors can be organized into a monolayer or multilayer film, in some instances. A monolayer or multilayer film might be prepared, for example, using the Langmuir-Schaffer or Langmuir-Blodgett methods. As a specific example, prefabricated nanoparticles (e.g., zirconia nanoparticles) can be dispersed in a carrier fluid (e.g., toluene), which can then be transferred (e.g., via a pipette) as a thin layer onto another layer of fluid (e.g., water). The carrier fluid can then be evaporated away leaving behind a film of nanoparticles. The film can then be transferred onto a substrate and used to grow carbon-based nanostructures.

In some embodiments, the nanopositor may comprise a metal or metalloid atom in a non-zero oxidation state that is bonded (e.g., ionically, covalently, etc.) to one or more relatively more electronegative elements in a stoichiometric form. For example, the nanopositor may comprise a stoichiometric oxide, chalcogenide, etc. One of ordinary skill in the art would be capable of identifying a stoichiometric form of such compounds. For example, a stoichiometric form of zirconium oxide is $ZrO_2$. A stoichiometric form of aluminum oxide is $Al_2O_3$. In some cases, the nanopositor may comprise a metal or metalloid atom in a non-zero oxidation state that is bonded (e.g., ionically, covalently, etc.) to a more electronegative element in non-stoichiometric form. The nanopositor may comprise such non-stoichiometric forms when, for example, the electropositive element is present in excess or shortage relative to the amount of one or more electronegative elements that would be observed in a stoichiometric form. For example, in cases where the nanopositor comprises an oxide, the oxide may be oxygen-rich or oxygen-deficient. In some cases, non-stoichiometric forms may arise from inclusion of dopants in the nanopositor. For example, non-stoichiometry may be observed due to the inclusion of less than about 50%, less than about 35%, less than about 20%, less than about 10%, less than about 5%, less than about 2%, less than about 1%, or less than about 0.5% Ca, Mg, Sr, Ba, Y, Mo, or other elements, or combinations of these and/or other elements.

The nanopositor may comprise zirconium oxide, in some embodiments. The zirconium oxide nanopositor may be stoichiometric (e.g., $ZrO_2$) or non-stoichiometric. In some embodiments, the zirconium oxide may form a metastable oxygen-deficient state. A material is said to be in an oxygen-deficient state when it comprises an amount of oxygen less than what would be present in the material's stoichiometric form. In some embodiments, the zirconium oxide may comprise an oxygen to zirconium ratio ranging from about 1.0 to about 2.0 (i.e., $ZrO_{1.0-2.0}$), from about 1.6 to about 2.0 (i.e., $ZrO_{1.6-2.0}$), from about 1.6 to about 1.8 (i.e., $ZrO_{1.6-1.8}$), or from about 1.0 to about 1.6 (i.e., $ZrO_{1.0-1.6}$). In some embodiments, the zirconium oxide may be suboxide, for example, with a formula of ZrO. In some embodiments, the zirconium oxide may be a superoxide (i.e., the ratio of oxygen to zirconium in the zirconium oxide is greater than about 2:1).

In some embodiments, oxides can include lanthanum oxide, hafnium oxide, tantalum oxide, niobium oxide, molybdenum oxide, and yttrium oxide. Not wishing to be bound by any theory, these oxides may be particularly suitable, in some embodiments, due to their proximity to zirconium on the periodic table. Metalloid oxides may comprise, for example, silicon oxide, germanium oxide, and the like.

In some embodiments, the metal or metalloid atoms in a non-zero oxidation state in the nanopositor are not reduced to a zero oxidation state during formation of the nanostructures. In some embodiments, fewer than about 2%, fewer than about 1%, fewer than about 0.1%, or fewer than about 0.01% of the metal or metalloid atoms in a non-zero oxidation state in the nanopositor are reduced to a zero-oxidation state during formation of the nanostructures. In some embodiments, substantially none of the metal or metalloid atoms in a non-zero oxidation state in the nanopositor are reduced to a zero-oxidation state during formation of the nano structures.

In some instances, the metal or metalloid atoms in a non-zero oxidation state do not form carbides during the formation of the nano structures. In some embodiments, fewer than about 2%, fewer than about 1%, fewer than about 0.1%, or fewer than about 0.01% of the metal or metalloid atoms in a non-zero oxidation state in the nanopositor are form carbides during formation of the nanostructures. In some embodiments, substantially none of the metal or metalloid atoms in a non-zero oxidation state in the nanopositor form carbides during formation of the nanostructures.

Process conditions and/or nanopositors can be chosen, in some instances, such that the metal or metalloid atoms in a non-zero oxidation state in the nanopositor are not reduced to a zero oxidation state and do not form carbides (or are done so only to a relatively small degree) during formation of the nanostructures. For example, in one set of embodiments, the nanopositor comprises zirconium oxide, and the process temperature is selected such that neither zero-oxidation-state zirconium (e.g., metallic zirconium) nor zirconium carbide are formed during formation of the nano structures. In some embodiments, the nanostructures are formed at a temperature below about 1100° C., below about 1050° C., below about 1000° C., below about 900° C., below about 800° C., below about 700° C., below about 600° C., below about 500° C., below about 400° C., above about 300° C., above about 400° C., above about 500° C., above about 600° C., above about 700° C., above about 800° C., above about 900° C., above about 1000° C., above about 1050° C., or between about 300° C. and about 500° C., between about 300° C. and about 1100° C., between about 300° C. and about 1050° C., between about 300° C. and about 1000° C., between about 300° C. and about 900° C., between about 300° C. and about 500° C., between about 500° C. and about 900° C., between about 500° C. and about 1000° C., between about 500° C. and about 1050° C., or between about 500° C. and about 1100° C., and the metal or metalloid atoms in a non-zero oxidation state in the nanopositor are not reduced to a zero oxidation state and do not form a carbide during formation of the nanostructures.

In some embodiments, the nanopositor, the growth substrate, and/or the conditions under which the nanostructures are grown are selected such that the amount of chemical interaction or degradation between the substrate and the nanopositor is relatively small. For example, in some cases, the nanopositor does not diffuse significantly into or significantly chemically react with the substrate during formation of the nano structures. One of ordinary skill in the art will be able to determine whether a given nanopositor has diffused significantly into or significantly chemically reacted with a substrate. For example, X-ray photoelectron spectroscopy (XPS), optionally with depth profiling, may be used to determine whether a nanopositor has diffused into a substrate or whether elements of the substrate have diffused into the nanopositor. X-ray diffraction (XRD), optionally coupled with XPS, may be used to determine whether a nanopositor and a substrate have chemically reacted with each other. Secondary ion mass spectroscopy (SIMS) can be used to determine chemical composition as a function of depth.

Figure 1B:
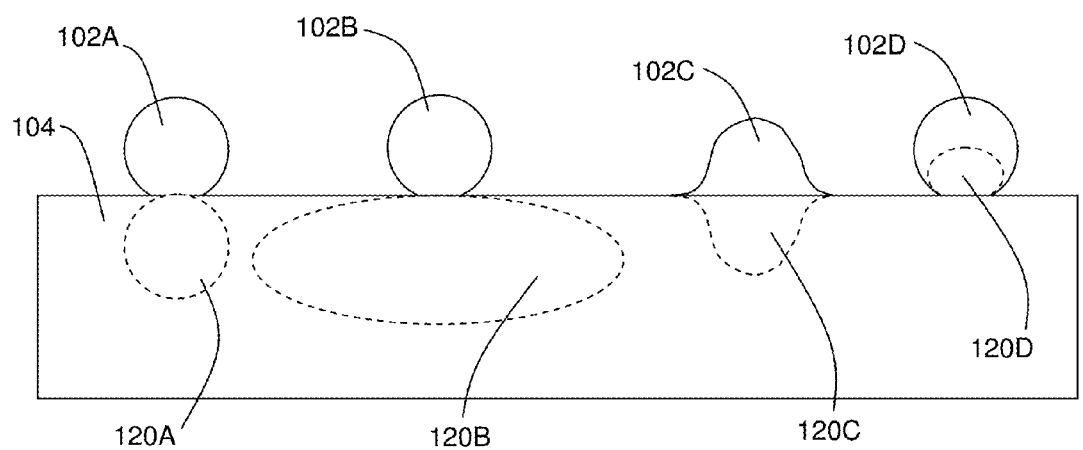

FIG. 1B illustrates a set of embodiments in which nanopositor 102 can interact with substrate 104. The volume within which the nanopositor interacts with the substrate is shown as volume 120. In FIG. 1B, spherical nanopositor 102A interacts with substrate 104 over volume 120A, which is roughly equivalent to the original volume of nanopositor 102A. Spherical nanopositor 102B interacts with substrate 104 over volume 120B, which is roughly equivalent to three times the original volume of nanopositor 102B. Wetted nanopositor 102C is shown interacting with substrate 104 over volume 120C, which is roughly equivalent to the original volume of nanopositor 102C. In addition, substrate 104 is illustrated diffusing into nanopositor 102D, with the interaction volume indicated as volume 120D. In some embodiments, chemical reaction between the nanopositor and the substrate may occur, in which case the volume within which the nanopositor and the substrate interact is defined by the volume of the reaction product. The volume of the chemical product may be determined, for example, via XPS analysis, using XRD to determine the chemical composition of the product and verify that it originated from the nanopositor. In some embodiments, the nanopositor may diffuse into the substrate or the substrate may diffuse into the nanopositor, in which case the volume within which the nanopositor and the substrate interact is defined by the volume over which the nanopositor and/or the substrate diffuses. The volume over which a nanopositor diffuses can be determined, for example, using XPS with depth profiling.

In some embodiments, the volume within which the nanopositor interacts with the substrate (e.g., the volume of the product produced via a chemical reaction between the nanopositor and the substrate, the volume over which the nanopositor and/or substrate diffuses into the other, etc.) is relatively small compared to the original volume of the nanopositor as formed on the substrate. In some instances, the volume of the nanopositor as formed on the substrate is at least about 0.1%, at least about 0.5%, at least about 1%, at least about 5%, at least about 10%, at least about 25%, at least about 50%, at least about 100%, at least about 200%, at least about 500%, at least about 2500%, at least about 5000%, at least about 10,000%, at least about 50,000%, or at least about 100,000% greater than the volume within which the nanopositor interacts with the substrate (e.g., via reaction, via diffusion, via a combination of mechanisms, etc.).

In some embodiments, the mass percentage of the nanopositor that interacts with the substrate (e.g., via reaction of the nanopositor and the substrate, diffusion of the nanopositor into substrate, diffusion of the substrate into the nanopositor, or a combination of these) is relatively low. In some embodiments, less than about 50 atomic %, less than about 25 atomic %, less than about 10 atomic %, less than about 5 atomic %, less than about 2 atomic %, or less than about 1 atomic % of the nanopositor as formed on the substrate interacts with the substrate. The percentage of the nanopositor that interacts with the substrate can be determined, for example, using XPS with depth profiling. Optionally, XRD can be employed to determine the composition of the measured material.

Interaction between the nanopositor and the substrate may be determined, in some embodiments, by measuring the conductivity of the substrate before and after the growth of the nanostructures. In some cases, the resistance of the substrate does not change by more than about 100%, by more than about 50%, by more than about 25%, by more than about 10%, by more than about 5%, or by more than about 1% relative to the resistance of a substrate exposed to essentially identical conditions in the absence of the nanopositor. "Essentially identical conditions," in this context, means conditions that are similar or identical, other than the presence of the nanopositor. For example, otherwise identical conditions may refer to a substrate that is identical and an environment that is identical (e.g., identical temperature, pressure, gas composition, gas concentration, other processing conditions, etc.), but where the nanopositor is not present. Suitable techniques for measuring the resistance of a substrate are described, for example, in ASTM Designation: D 257-99, entitled "Standard Test Methods for DC Resistance or Conductance of Insulating Materials" (Reapproved 2005), which is incorporated herein by reference in its entirety.

In some cases, the interaction of the nanopositor and the substrate may be determined by measuring the tensile strength of the substrate before and after formation of the nanostructures. In some embodiments, the tensile strength of the substrate is less than about 20% lower, less than about 10% lower, less than about 5% lower, or less than about 1% lower than the tensile strength of a substrate exposed to essentially identical conditions in the absence of the nanopositor. Suitable techniques for measuring the tensile strength of a single fiber (e.g., a carbon or graphite fiber) can be found, for example, in "Standard Test Method for Tensile Strength and Young's Modulus of Fibers," ASTM International, Standard ASTM C 1557-03, West Conshohocken, Pa., 2003, which is incorporated herein by reference in its entirety. Suitable techniques for measuring the tensile strength of other substrates may be found, for example, in M. Madou, "Fundamentals of Microfabrication," 2nd edition, CRC Press (2002), which is incorporated herein by reference in its entirety.

The nanopositors described herein may be of any suitable form. For example, in some cases, the nanopositor may comprise a film (e.g., positioned on a growth substrate). In some instances, the nanopositor may be deposited on a growth substrate in a pattern (e.g., lines, dots, or any other suitable form).

In some cases, the nanopositor may comprise a series of nano-scale features. As used herein, a "nanoscale feature" refers to a feature, such as a protrusion, groove or indentation, particle, or other measurable geometric feature on an article that has at least one cross-sectional dimension of less than about 1 micron. In some cases, the nanoscale feature may have at least one cross-sectional dimension of less than about 500 nm, less than about 250 nm, less than about 100 nm, less than about 10 nm, less than about 5 nm, less than about 3 nm, less than about 2 nm, less than about 1 nm, between about 0.3 and about 10 nm, between about 10 nm and about 100 nm, or between about 100 nm and about 1 micron. Not wishing to be bound by any theory, the nano-scale feature may increase the rate at which a reaction, nucleation step, or other process involved in the formation of a nanostructure occurs. Nanoscale features can be formed, for example, by roughening the surface of a nanopositor.

In some instances, the nanopositor may comprise nanoparticles. Generally, the term "nanoparticle" is used to refer to any particle having a maximum cross-sectional dimension of less than about 1 micron. In some embodiments, a nanopositor nanoparticle may have a maximum cross-sectional dimension of less than about 500 nm, less than about 250 nm, less than about 100 nm, less than about 10 nm, less than about 5 nm, less than about 3 nm, less than about 2 nm, less than about 1 nm, between about 0.3 and about 10 nm, between about 10 nm and about 100 nm, or between about 100 nm and about 1 micron. A plurality of nanopositor nanoparticles may, in some cases, have an average maximum cross-sectional dimension of less than about 1 micron, less than about 100 nm, less than about 10 nm, less than about 5 nm, less than about 3 nm, less than about 2 nm, less than about 1 nm, between about 0.3 and about 10 nm, between about 10 nm and about 100 nm, or between about 100 nm and about 1 micron. As used herein, the "maximum cross-sectional dimension" refers to the largest distance between two opposed boundaries of an individual structure that may be measured. The "average maximum cross-sectional dimension" of a plurality of structures refers to the number average.

In some instances, the nanopositor particles may be substantially the same shape and/or size ("monodisperse"). For example, the nanopositor particles may have a distribution of dimensions such that the standard deviation of the maximum cross-sectional dimensions of the nanopositor particles is no more than about 50%, no more than about 25%, no more than about 10%, no more than about 5%, no more than about 2%, or no more than about 1% of the average maximum cross-sectional dimensions of the nanopositor particles. Standard deviation (lower-case sigma) is given its normal meaning in the art, and may be calculated as:

$$\sigma = \sqrt{\frac{\sum_{i=1}^{n}(D_i - D_{avg})^2}{n-1}}$$

wherein $D_i$ is the maximum cross-sectional dimension of nanopositor particle i, $D_{avg}$ is the average of the cross-sectional dimensions of the nanopositor particles, and n is the number of nanopositor particles. The percentage comparisons between the standard deviation and the average maximum cross-sectional dimensions of the nanopositor particles outlined above can be obtained by dividing the standard deviation by the average and multiplying by 100%.

The nanopositors described herein may be prepared via a variety of methods. For example, in some embodiments, nanopositors comprising metal or metalloid atoms in a non-zero oxidation state may be prepared via reduction of a salt or oxidation of a metal, metalloid, or carbide. Zirconium oxide nanopositors may be, for example, prepared from sol-gel precursors such as zirconium propoxide. In some instances, zirconium oxide particles may be prepared from reduction of zirconium oxychloride ($ZrOCl_2$) or from the oxidation of zirconium metal or zirconium carbide nanoparticles or thin films. In some embodiments, the nanopositor may be prepared via e-beam deposition or sputter deposition. One or more dopants may be included in the nanopositor by, for example, ball-milling the dopant material into the deposition target (e.g., an e-beam target), and subsequently depositing the material in the target. In some embodiments, the dopant may be incorporated into the precursor material from which the nanopositor is formed via chemical vapor deposition. For example, the dopant may be incorporated into a sol, in some embodiments. In some instances, the nanopositors can be prepared through non-hydrolytic sol-gel reactions that result in the formation of nanoparticles or other nanostructures.

A variety of growth substrates may be used in accordance with the systems and methods described herein. Growth substrates may comprise any material capable of supporting nanopositors and/or nanostructures as described herein. The growth substrate may be selected to be inert to and/or stable under sets of conditions used in a particular process, such as nanostructure growth conditions, nanostructure removal conditions, and the like. In some cases, the growth substrate comprises a substantially flat surface. In some cases, the growth substrate comprises a substantially nonplanar surface. For example, the growth substrate may comprise a cylindrical surface. Substrates suitable for use in the invention include high-temperature prepregs, high-temperature polymer resins, inorganic materials such as metals, alloys, intermetallics, metal oxides, metal nitrides, ceramics, and the like. As used herein, the term "prepreg" refers to one or more layers of thermoset or thermoplastic resin containing embedded fibers, for example fibers of carbon, glass, silicon carbide, and the like. In some embodiments, the substrate may comprise carbon (e.g., amorphous carbon, carbon aerogel, carbon fiber, graphite, glassy carbon, carbon-carbon composite, graphene, aggregated diamond nanorods, nanodiamond, diamond, and the like). In some cases, the substrate may be a fiber, tow of fibers, a weave (e.g., a dry weave), and the like. The substrate may further comprise a conducting material, such as conductive fibers, weaves, or nanostructures.

In some embodiments, the substrates are reactive with zero-oxidation-state metals and/or carbides, but are not reactive with oxides or other materials comprising metals or metalloids in a non-zero oxidation state. Also, substrates may comprise, in some cases, a material upon which growth of nanostructures would be inhibited due to unfavorable chemical reactions between the substrate and a zero-oxidation-state metal and/or metal-carbide nanopositor, but does not react with metal oxides, metalloid oxides, or other materials comprising metals or metalloids in a non-zero oxidation state.

In some cases, the substrates as described herein may comprise polymers capable of withstanding the conditions under which nanostructures are grown. Examples of suitable polymers that can be used in the growth substrate include, but are not limited to, relatively high temperature fluoropolymers (e.g., Teflon®), polyetherether ketone (PEEK), and polyether ketone (PEK), and the like.

In some embodiments, the substrates used herein are substantially transparent to electromagnetic radiation. For example, in some cases, the substrate may be substantially transparent to visible light, ultraviolet radiation, infrared radiation, microwave radiation, or radar frequencies.

In some cases, the nanostructures may be grown on the growth substrate during formation of the growth substrate itself. For example, fibers (e.g., graphite fibers) may be formed in a continuous process, in combination with nanostructure fabrication as described herein. In an illustrative embodiment, carbon fibers comprising nanostructures on the surface of the fibers may formed at elevated temperature by first stabilizing the carbon fiber precursor material, typically under stress at elevated temperature, followed by carbonization and or graphitization pyrolysis steps at elevated temperatures (e.g., greater than 500° C.) to form the fiber. The nanostructures may be grown on the surface of the fibers, followed by surface treatments, sizing, spooling, or other processing techniques.

Figure 2:
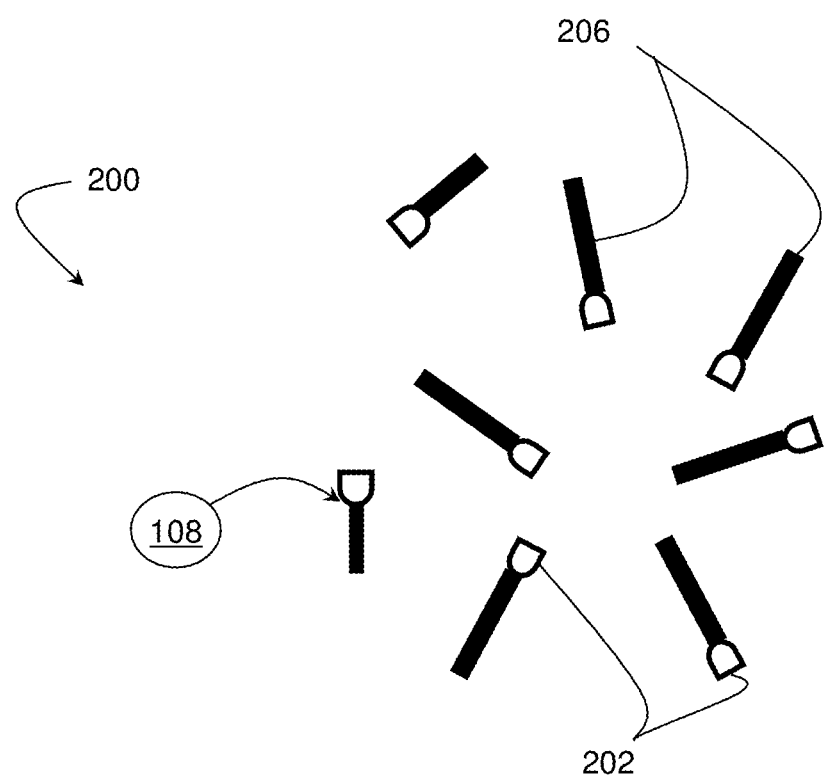
FIG. 2 includes an exemplary schematic illustration of nanostructure growth in the absence of a growth substrate.

While growth of nanostructures using a growth substrate has been described in detail, the embodiments described herein are not so limited, and nanostructures may be formed, in some embodiments, on a nanopositor comprising metal or metalloid atoms in a non-zero oxidation state in the absence of a growth substrate. For example, FIG. 2 includes a schematic illustration of system 200 in which nanopositor 202 is placed under a set of conditions selected to facilitate nanostructure growth in the absence of a growth substrate in contact with the nanopositor. Nanostructures 206 may grow from nanopositor 202 as the nanopositor is exposed to the growth conditions. In some embodiments, the nanopositor may be suspended in a fluid. For example, a nanopositor may be suspended in a gas (e.g., aerosolized) and subsequently exposed to a carbon-containing precursor material, from which carbon nanotubes may be grown. In some cases, the nanopositor may be suspended in a liquid (e.g., an alcohol that serves as a nanostructure precursor material) during the formation of the nanostructures.

As used herein, exposure to a "set of conditions" may comprise, for example, exposure to a particular temperature, pH, solvent, chemical reagent, type of atmosphere (e.g., nitrogen, argon, oxygen, etc.), electromagnetic radiation, or the like. In some cases, the set of conditions may be selected to facilitate nucleation, growth, stabilization, removal, and/or other processing of nanostructures. In some cases, the set of conditions may be selected to facilitate reactivation, removal, and/or replacement of the nanopositor. In some cases, the set of conditions may be selected to maintain the activity of the nanopositor. Some embodiments may comprise a set of conditions comprising exposure to a source of external energy. The source of energy may comprise electromagnetic radiation, electrical energy, sound energy, thermal energy, or chemical energy. For example, the set of conditions comprises exposure to heat or electromagnetic radiation, resistive heating, exposure to a laser, or exposure to infrared light. In some embodiments, the set of conditions comprises exposure to a particular temperature, pressure, chemical species, and/or nanostructure precursor material. For example, in some cases, exposure to a set of conditions comprises exposure to substantially atmospheric pressure (i.e., about 1 atm or 760 torr). In some cases, exposure to a set of conditions comprises exposure to a pressure of less than about 1 atm (e.g., less than about 100 torr, less than about 10 torr, less than about 1 torr, less than about 0.1 torr, less than about 0.01 torr, or lower). In some cases, the use of high pressure may be advantageous. For example, in some embodiments, exposure to a set of conditions comprises exposure to a pressure of at least about 2 atm, at least about 5 atm, at least about 10 atm, at least about 25 atm, or at least about 50 atm. In some instances, the set of conditions comprises exposure to a temperature below about 1100° C., below about 1050° C., below about 1000° C., below about 900° C., below about 800° C., below about 700° C., below about 600° C., below about 500° C., below about 400° C., above about 300° C., above about 400° C., above about 500° C., above about 600° C., above about 700° C., above about 800° C., above about 900° C., above about 1000° C., above about 1050° C., or between about 300° C. and about 500° C., between about 300° C. and about 1100° C., between about 300° C. and about 1050° C., between about 300° C. and about 1000° C., between about 300° C. and about 900° C., between about 300° C. and about 500° C., between about 500° C. and about 900° C., between about 500° C. and about 1000° C., between about 500° C. and about 1050° C., or between about 500° C. and about 1100° C. In some embodiments, exposure to a set of conditions comprises performing chemical vapor deposition (CVD) of nanostructures on the nanopositor. In some embodiments, the chemical vapor deposition process may comprise a plasma chemical vapor deposition process. Chemical vapor deposition is a process known to those of ordinary skill in the art, and is explained, for example, in Dresselhaus M S, Dresselhaus G., and Avouris, P. eds. "Carbon Nanotubes: Synthesis, Structure, Properties, and Applications" (2001) Springer, which is incorporated herein by reference in its entirety.

In some embodiments, the systems and methods described herein may be used to produce substantially aligned nanostructures. The substantially aligned nanostructures may have sufficient length and/or diameter to enhance the properties of a material when arranged on or within the material. In some embodiments, the set of substantially aligned nanostructures may be formed on a surface of a growth substrate, and the nanostructures may be oriented such that the long axes of the nanostructures are substantially non-planar with respect to the surface of the growth substrate. In some cases, the long axes of the nanostructures are oriented in a substantially perpendicular direction with respect to the surface of the growth substrate, forming a nanostructure array or "forest." The alignment of nanostructures in the nanostructure "forest" may be substantially maintained, even upon subsequent processing (e.g., transfer to other surfaces and/or combining the forests with secondary materials such as polymers), in some embodiments. Systems and methods for producing aligned nanostructures and articles comprising aligned nanostructures are described, for example, in International Patent Application Serial No. PCT/US2007/011914, filed May 18, 2007, entitled "Continuous Process for the Production of Nanostructures Including Nanotubes"; and U.S. Pat. No. 7,537,825, issued on May 26, 2009, entitled "Nano-Engineered Material Architectures: Ultra-Tough Hybrid Nanocomposite System," which are incorporated herein by reference in their entirety.

In some cases, a source of external energy may be coupled with the growth apparatus to provide energy to cause the growth sites to reach the necessary temperature for growth. The source of external energy may provide thermal energy, for example, by resistively heating a wire coil in proximity to the growth sites (e.g., nanopositor) or by passing a current through a conductive growth substrate. In some cases, the source of external energy may provide an electric and/or magnetic field to the growth substrate. In some cases, the source of external energy may provided via magnetron heating, via laser, or via direct, resistive heating the growth substrate, or a combination of one or more of these. In an illustrative embodiment, the set of conditions may comprise the temperature of the growth substrate surface, the chemical composition of the atmosphere surrounding the growth substrate, the flow and pressure of reactant gas(es) (e.g., nanostructure precursors) surrounding the substrate surface and within the surrounding atmosphere, the deposition or removal of nanopositor, or other materials, on the surface of the growth surface, and/or optionally the rate of motion of the substrate. In some cases, the source of external energy may provide X-rays to the growth substrate and/or nanopositor. Not wishing to be bound by any particular theory, the X-rays might induce oxygen deficiency into the nanopositor, might activate the nanopositor, and/or it might change the gas species coming into contact with the nanopositor.

In some cases, the nanostructures may be removed from a growth substrate after the nanostructures are formed. For example, the act of removing may comprise transferring the nanostructures directly from the surface of the growth substrate to a surface of a receiving substrate. The receiving substrate may be, for example, a polymer material or a carbon fiber material. In some cases, the receiving substrate comprises a polymer material, metal, or a fiber comprising $Al_2O_3$, $SiO_2$, carbon, or a polymer material. In some cases, the receiving substrate comprises a fiber comprising $Al_2O_3$, $SiO_2$, carbon, or a polymer material. In some embodiments, the receiving substrate is a fiber weave.

Removal of the nanostructures may comprise application of a mechanical tool, mechanical or ultrasonic vibration, a chemical reagent, heat, or other sources of external energy, to the nanostructures and/or the surface of the growth substrate. In some cases, the nanostructures may be removed by application of compressed gas, for example. In some cases, the nanostructures may be removed (e.g., detached) and collected in bulk, without attaching the nanostructures to a receiving substrate, and the nanostructures may remain in their original or "as-grown" orientation and conformation (e.g., in an aligned "forest") following removal from the growth substrate. Systems and methods for removing nanostructures from a substrate, or for transferring nanostructures from a first substrate to a second substrate, are described in International Patent Application Serial No. PCT/US2007/011914, filed May 18, 2007, entitled "Continuous Process for the Production of Nanostructures Including Nanotubes," which is incorporated herein by reference in its entirety.

In some embodiments, the nanopositor may be removed from the growth substrate and/or the nanostructures after the nanostructures are grown. Nanopositor removal may be performed mechanically, for example, via treatment with a mechanical tool to scrape or grind the nanopositor from a surface (e.g., of a growth substrate). In some cases, the first nanopositor may be removed by treatment with a chemical species (e.g., chemical etching) or thermally (e.g., heating to a temperature which evaporates the nanopositor). For example, in some embodiments, the nanopositor may be removed via an acid etch (e.g., HCl, HF, etc.), which may, for example, selectively dissolve the nanopositor. For example, HF can be used to selectively dissolve oxides.

As used herein, the term "metal" includes the following elements: lithium, sodium, potassium, rubidium, cesium, francium, beryllium, magnesium, calcium, strontium, barium, radium, zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum, gold, mercury, rutherfordium, dubnium, seaborgium, bohrium, hassium, meitnerium, darmstadtium, roentgenium, ununbium, aluminium, gallium, indium, tin, thallium, lead, bismuth, ununtrium, ununquadium, ununpentium, ununhexium, lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, and lawrencium.

The term "metalloid," as used herein, includes the following elements: boron, silicon, germanium, arsenic, antimony, tellurium, and polonium.

As used herein, the term "non-metal" includes the following elements: hydrogen, carbon, nitrogen, phosphorous, oxygen, sulfur, selenium, fluorine, chlorine, bromine, iodine, astatine, helium, neon, argon, krypton, xenon, and radon, and ununoctium.

The following documents are incorporated herein by reference in their entirety for all purposes: International Patent Application Serial No. PCT/US2007/011914, filed May 18, 2007, entitled "Continuous Process for the Production of Nanostructures Including Nanotubes," published as WO 2007/136755 on Nov. 29, 2007; International Patent Application Serial No. PCT/US07/11913, filed May 18, 2007, entitled "Nanostructure-reinforced Composite Articles and Methods," published as WO 2008/054541 on May 8, 2008; International Patent Application Serial No. PCT/US2008/009996, filed Aug. 22, 2008, entitled "Nanostructure-reinforced Composite Articles and Methods," published as WO 2009/029218 on Mar. 5, 2009; U.S. Pat. No. 7,537,825, issued on May 26, 2009, entitled "Nano-Engineered Material Architectures: Ultra-Tough Hybrid Nanocomposite System;" U.S. patent application Ser. No. 11/895,621, filed Aug. 24, 2007, entitled "Nanostructure-Reinforced Composite Articles," published as U.S. Patent Application Publication No. 2008/0075954 on Mar. 27, 2008; U.S. patent application Ser. No. 12/618,203, filed Nov. 13, 2009, entitled "Controlled-Orientation Films and Nanocomposites Including Nanotubes or Other Nanostructures;" U.S. patent application Ser. No. 12/630,289, filed Dec. 3, 2009, entitled "Multifunctional Composites Based on Coated Nanostructures;" and U.S. Provisional Patent Application Ser. No. 61/230,267, filed Jul. 31, 2009, entitled "Systems and Methods Related to the Formation of Carbon-Based Nanostructures," by Steiner, et al. All other patents, patent applications, and documents cited herein are also hereby incorporated by reference in their entirety for all purposes.

The following examples are intended to illustrate certain embodiments of the present invention, but do not exemplify the full scope of the invention.

Example 1

In this example, nanoparticulate zirconia ($ZrO_2$) was used as a nanopositor to produce multi-walled nanotube (MWNT) and single-walled nanotube (SWNT) growth by thermal chemical vapor deposition (CVD). In addition, nanoparticulate zirconia ($ZrO_2$) was used as a nanopositor in the transformation of solid amorphous carbon into graphitic nanoshells. Si substrates were coated with films of $ZrO_2$ deposited from liquid solutions and found that processing of theses substrates by CVD resulted in substantial carbon nanotube (CNT) growth. In situ X-ray photoelectron spectroscopy (XPS) analysis during CVD growth of CNTs from several substrates with zirconia was used to show that the CNT growth occurred on an oxide, and the oxide remained in an oxidized state during growth. Depending on temperature and gas flow conditions used during CVD, these substrates demonstrated the ability to grow either SWNTs or MWNTs, including local vertically aligned "forest" morphologies which are indicative of high nanopositor particle activity. In addition, solid-state interactions between zirconia and carbon at elevated temperatures were investigated by preparing zirconia nanoparticle-doped carbon aerogels. Aerogels were produced through pyrolysis of Zr(IV)-containing resorcinol-formaldehyde polymer aerogels at 800° C. and exhibited the presence of fullerenic cage structures absent in undoped carbon aerogels. Subsequent CVD processing of zirconia-doped carbon aerogels also resulted in the growth of CNTs, apparently from zirconia particles embedded in the aerogel skeleton. Ex situ XRD and XPS analysis of Si and carbon aerogel substrates before and after CNT growth found no metallic zirconium or zirconium carbide present, suggesting that zirconia nanoparticles were not reduced by the hydrogen- and hydrocarbon-rich CVD atmospheres of CNT growth. In situ XPS analysis of low-pressure CVD growth of CNTs on Si and carbon aerogel substrates verified that no metallic zirconium or zirconium carbide arises at any point prior to, during, or following CVD growth of CNTs from zirconia nanoparticles.

In the methods described in this example, great care was taken to prevent contamination by metals, especially iron. Clean, dedicated plastic and glass tools and containers were used for all stages of processing. Pyrolysis of aerogel samples and all CNT growth processes were conducted with an isolated set of new, dedicated quartz process tubes. The absence of CNT growth on $ZrO_2$-free Si substrates verified the absence of nanopositor contamination in the CVD systems used. XPS analysis of the substrates used also verified that no Fe, Co, Ni, or other obvious potential nanopositors were present before or after CVD processing.

Preparation of $ZrO_2$-Coated Si Substrates

All Si substrates used had a 200-300 nm layer of thermal $SiO_2$. Si substrates with $Al_2O_3$ supports were prepared through e-beam evaporation or RF sputter deposition of solid stoichiometric $Al_2O_3$. Si substrates with oxynitride support were prepared using a vertical thermal reactor followed by annealing. Saturated solutions of $ZrOCl_2.8H_2O$ in 2-propanol were prepared by adding 322 mg of $ZrOCl_2.8H_2O$ to 20.0 g of 2-propanol, sonicating for about 5 min, and allowing nanoparticles to form over the course of 4-5 days. These solutions were then stirred and used for dip-coating or drop-casting zirconia nanoparticles onto Si wafers.

Preparation of $ZrO_2$-Doped Carbon Aerogels $ZrO_2$-doped carbon aerogels and undoped control carbon aerogels were prepared using sol-gel processing through the ion-exchange technique developed for preparing metal-doped carbon aerogels, described in Steiner et al., "Iron-Doped Carbon Aerogels: Novel Porous Substrates for Direct Growth of Carbon Nanotubes," *Langmuir*, 2007, 23, 5161-5166, incorporated herein by reference. Briefly, the potassium salt of 2,4-dihydroxybenzoic acid was polymerized with formaldehyde in water to form a mesoporous $K^+$-doped resorcinol-formaldehyde polymer gel. Potassium carboxylate moieties throughout the gel structure acted as ion exchange sites, allowing the gel to be doped with other ions (such as transition metal ions) by exchanging the gel liquor with an aqueous ionic salt. Prior to ion exchange, the gel was purified by exchanging the gel liquor with deionized water. Ion exchange of $K^+$ for zirconyl was then performed by soaking the gel in a solution of aqueous 0.1 M $ZrOCl_2.8H_2O$ (Fluka, ≥99.0%, <0.4 μg/mg known CNT nanopositors). To serve as a control, an undoped gel was prepared by exchanging $K^+$ for $H^+$ through soaking in aqueous 0.1 N HCl. The gels were then purified and prepared for supercritical drying through multiple solvent exchanges (3 exchanges per solvent, 1 exchange per 24 h) first with deionized water, then acetone, and then finally liquid $CO_2$. The gels were then supercritically dried from $CO_2$ ($T_c$=31.1° C., $P_c$=72.9 atm, $T_{max}$=50° C., $P_{max}$=100 atm) to afford zirconyl-doped and undoped resorcinol-formaldehyde polymer aerogels, respectively. Finally, the aerogels were pyrolyzed under a flow of 200 sccm Ar at 800° C. or 1050° C. for 10.5 h, affording mesoporous carbon aerogels. In the case of the zirconyl-doped samples, the aerogels were found to be homogenously laced with polydisperse $ZrO_2$ nanoparticles encased in fullerenic nanoshells. The undoped aerogels exhibited a typical amorphous carbon structure only.

Growth of CNTs on $ZrO_2$

Thermal CVD growth of CNTs was performed on several different substrates, listed in Table 1.

TABLE 1

Summary of control and nanopositor substrates evaluated for activity toward CNT growth.

| Substrate Type | Control Substrate | Substrate(s) With Nanopositor |
| --- | --- | --- |
| Si wafer, (100) orientation, 200-300 nm thermal $SiO_2$ | Unmodified Si wafer with 200-300 nm thermal $SiO_2$ | Wafer dip-coated or drop-cast with saturated solution of $ZrOCl_2 \cdot 8H_2O$ in 2-propanol |
| Si wafer, (100) orientation, 200-300 nm thermal $SiO_2$ and 10 nm alumina | Unmodified Si wafer with 200-300 nm thermal $SiO_2$ and 10 nm alumina | Wafer dip-coated or drop-cast with saturated solution of $ZrOCl_2 \cdot 8H_2O$ in 2-propanol |

TABLE 1-continued

Summary of control and nanopositor substrates evaluated for activity toward CNT growth.

| Substrate Type | Control Substrate | Substrate(s) With Nanopositor |
|---|---|---|
| Si wafer, (100) orientation, 100 nm silicon oxynitride | Unmodified Si wafer with 100 nm silicon oxynitride | Wafer dip-coated or drop-cast with saturated solution of $ZrOCl_2 \cdot 8H_2O$ in 2-propanol |
| Carbon aerogel | Acid-neutralized (undoped) carbon aerogel | $ZrO_2$-doped carbon aerogel (6-8 nm mean $ZrO_2$ particle size) |
| Unsized carbon fibers (Hexcel, AS4C 3k tow) | Unmodified carbon fiber | Carbon fibers dip-coated with saturated solution of $ZrOCl_2 \cdot 8H_2O$ in 2-propanol |

Atmospheric thermal CVD was performed in a three-zone Lindberg/Blue M furnace with a 62-cm heated length using 50-mm inner diameter fused quartz process tubes with a length of 138 cm. Samples in this system were placed directly in the quartz tube between 50% and 75% of the heated length. Gases used were all ultrahigh purity grades (99.999%, Airgas, US). Low-pressure CVD growth for in situ XPS analysis was performed at the BESSY synchrotron in the end station of the FHI-MPG. It should be noted that the term "low-pressure" refers to sub-atmospheric CVD; however these same conditions are considered "high-pressure" for XPS. Samples in this system were transferred into a reaction cell and placed into differentially pumped stages of the lens system of a hemispherical analyzer (Phoibos 150, SPECS) about 2 mm away from the aperture. A focused IR laser was used for sample heating. Temperature readings were taken from a thermocouple spot-welded in the vicinity of the sample and, as such, an underestimation of up to about 100° C. may have occurred in some cases. The CVD atmosphere was constantly monitored by a mass spectrometer attached via a leak valve.

Atmospheric pressure CVD was performed with methane and ethylene feedstocks, according to the conditions outlined in Table 2. Low-pressure CVD employing acetylene was used for the in situ XPS analysis. For atmospheric pressure growths, Si substrates were processed with both methane and ethylene conditions; carbon aerogel and carbon fiber samples were only processed using ethylene growth conditions at atmospheric pressure. In situ XPS analysis was performed for zirconia on Si with alumina support and zirconia-doped carbon aerogel.

Characterization

Si-based substrates were characterized by scanning electron microscopy (SEM), ex situ X-ray photoelectron spectroscopy (XPS), in situ XPS during CNT growth, transmission electron microscopy (TEM), point-localized energy-dispersive X-ray spectroscopy (EDAX) under scanning transmission electron microscopy (STEM), and Raman spectroscopy. $ZrO_2$-doped carbon aerogels were characterized by powder X-ray diffraction (XRD), ex situ XPS, in situ XPS during CNT growth, SEM, TEM, point-localized EDAX under STEM, and Raman spectroscopy. Carbon fiber substrates were analyzed by SEM. XRD patterns were obtained using a PANalytical X'Pert Pro MPD with RTMS detector using Cu K-alpha radiation, a voltage of 45 kV, and a current of 40 mA. Phase identification and crystallite size determination were made using MDI Jade 7 equipped with the ICCD database. Ex situ XPS spectra were obtained on an AXIS Ultra DLD Spectrometer (Kratos Analytical Ltd, UK) using Al K-alpha radiation (energy=1486.6 eV) in a chamber with a base pressure of $5 \times 10^{-9}$ torr. For the carbon aerogels, XPS samples were prepared either by grinding the material into a fine powder and adhering to adhesive copper tape or by adhering monoliths directly to copper tape. The copper tape was mounted on a sample holder using double-sided adhesive carbon tape. Silicon substrates were directly mounted on the sample holder with carbon tape. All measurements were performed using an X-ray power of 150 W (15 kV and 10 mA), a pass energy of 10 eV, and an analysis area of 750 µm×350 µm. A charge neutralizer was not used. Charge correction for carbon aerogel samples was not performed as no charging effect was observed; charge correction for silicon substrates was performed using peaks from $SiO_2$ or $Al_2O_3$ supports as

TABLE 2

Summary of CVD conditions evaluated for CNT growth from zirconia nanopositors.

| Feedstock | Pressure | Ramp | Soak | Growth | Cool Down |
|---|---|---|---|---|---|
| $CH_4$ | Atmospheric | Ambient to 900° C. at 20° C. min$^{-1}$; 400 sccm He | 0-10 min; 200 sccm $H_2$ | 15 min; 500 sccm $CH_4$, 100 sccm $H_2$ | 400 sccm He |
| $C_2H_4$ | Atmospheric | Ambient to 750° C. at 50° C. min$^{-1}$; 400 sccm He | 0-10 min; 400 sccm He, 1600 sccm $H_2$ | 10 min; 400 sccm $C_2H_4$, 400 sccm He, 1600 sccm $H_2$ | 400 sccm He |
| $C_2H_2$ | Low-Pressure | Ambient to ~530° C. at ~125° C. min$^{-1}$; 0.1 mbar $H_2$ | 15 min; 0.1 mbar $H_2$, followed by 20 min under 10–7 mbar vacuum | 10 min; 10-2 mbar $C_2H_2$ only, followed by 20 min $C_2H_2$:$H_2$ mixture (1:5 ratio) at 0.2 mbar | Under $10^{-7}$ mbar vacuum or 0.1 mbar $H_2$ | reference points. High-pressure in situ XPS spectra were collected in normal emission geometry at photon energies of 500 eV with a spectral resolution of about 0.3-0.4 eV. At these photon energies, the electron mean free path is about 10.5 Angstroms. The analysis area was about 100 μm×1 mm. Background correction was performed using a Shirley background. Spectra were fitted following the Levenberg-Marquardt algorithm to minimize the $\chi^2$ value. Peak shapes were modeled using asymmetric Doniach-Sunjic functions convolved with Gaussian profiles. High-resolution scanning electron microscopy (HRSEM) was performed with a JEOL 6320 microscope and FEI Philips XL30 sFEG operating at 14 kV for carbon aerogel samples, 5 kV for carbon fiber samples and MWNT Si substrates, and 2.5 kV for samples from the in situ XPS analysis. High-resolution transmission electron microscopy (HRTEM) of carbon aerogels and derived nanotube composites was performed on a JEOL JEM-200CX operating at 200 keV. HRTEM and STEM of CNTs grown during in situ XPS experiments was performed on a JEOL 2010F operating at 200 kV equipped with an INCA system for performing EDAX. Raman spectra were obtained using a custom-built micro-Raman spectrometer operating at an excitation wavelength of 647 nm with a laser power of 25 mW and a collection time of 5 s. Peak fitting was performed using CasaXPS operating in Raman analysis mode. Peak shapes were modeled using an asymmetric Lorentzian lineshape convolved with a Gaussian profile with tail exponents $\alpha=1$ and $\beta=1$ and Gaussian width m=2 (program line shape LA(1, 1,2)).

Results and Discussion

Figure 3A:
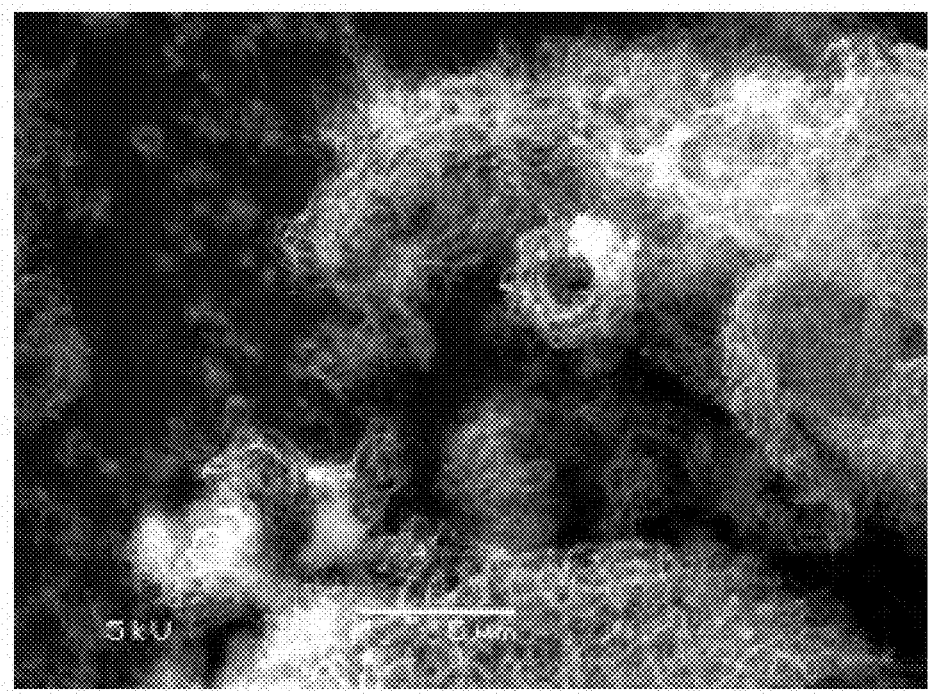
FIGS. 3A-3B include (A) an SEM of bundles of aligned CNTs grown using zirconia nanopositors on a silicon oxynitride support using an ethylene feedstock at 750° C., and (B) a close-up of large diameter MWNTs extending from a cluster of zirconia particles, according to one set of embodiments.
Figure 3B:
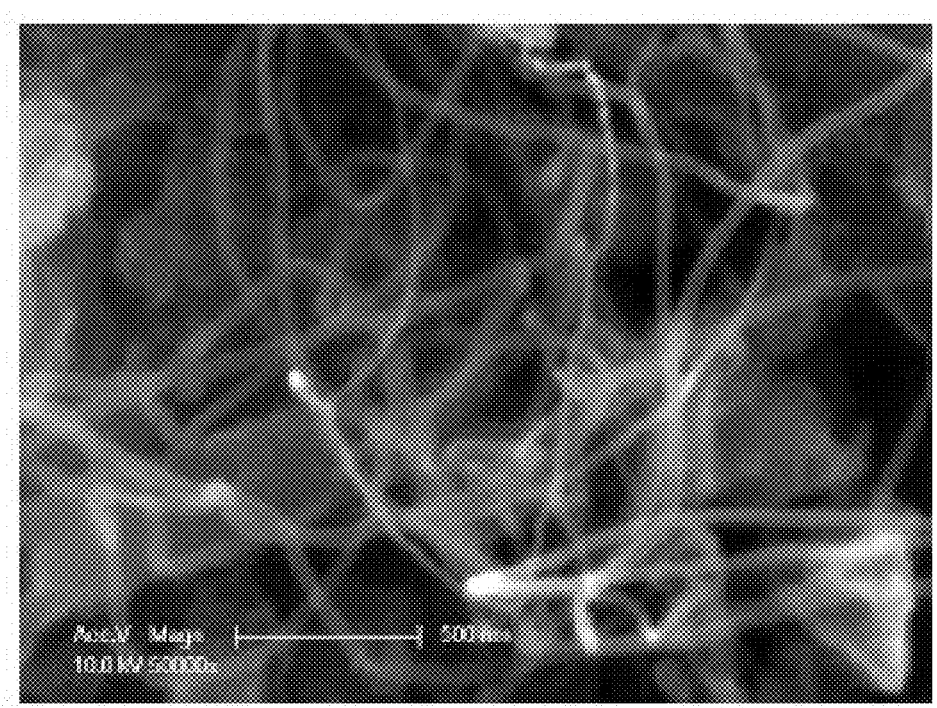

Growth of CNTs from zirconia on Si substrates was first evaluated by drop-casting a saturated solution of $ZrOCl_2 \cdot 8H_2O$ in 2-propanol onto Si wafers with a silicon oxynitride barrier. Following pretreatment under hydrogen and CVD processing of these wafers with ethylene feedstock at 750° C., bundles of aligned CNTs ("mini-forests") could be observed at various locations on these wafers with SEM (see FIGS. 3A-3B). While much of these wafers exhibited no growth, growth was in high yield where it was observed. Also observable on these wafers were cracked platelets, clusters, and films of zirconia, upon which the mini-forests and other long (greater than 5 μm) CNT bundles were observed. Similar results were observed for zirconia on alumina and silica.

To understand whether zirconia or a reduced zirconium species (resulting from high-temperature exposure to hydrogen and hydrocarbons, for example) served as the CNT growth nanopositor on these substrates, zirconia-coated wafers were analyzed by XPS ex situ of CVD growth. Both prior to and following exposure of the wafers to the CVD growth conditions, no metallic zirconium or zirconium carbide was found to be observable, and instead only high-binding energy chemistries in the range expected for $ZrO_2$ were found. These observations were substantiated by the understanding of $ZrO_2$ chemistry at high temperatures in the literature. $ZrO_2$ is known to not be reduced by $H_2$, even at temperatures of 1500° C. and higher.

Additionally, carbothermic reduction of $ZrO_2$ does not yield Zr metal but instead results in the formation of ZrC, and Sacks et al. (Journal of Materials Science 2004, 39, 6057-6066, incorporated herein by reference) have reported that carbothermic reduction of even nanocrystalline $ZrO_2$ to ZrC under Ar only begins at temperatures around 1200° C.—much higher than the growth temperatures used in this study. Considering the phase diagrams of bulk $ZrO_2$—$Al_2O_3$ and $ZrO_2$—$SiO_2$, no significant reaction with the support is expected to occur at the conditions for CVD growth of CNTs. The phase diagram for the $ZrO_2$—$SiO_2$ system shows that at less than 1000° C., monoclinic $ZrO_2$ plus zircon ($ZrSiO_4$) is the favorable phase configuration. However, if zircon were forming during the CVD growth conditions, the XPS spectrum would show an additional silicon chemistry superimposed over the signal for $SiO_2$ in the Si 2p region, as well as a specific shift in the Zr 3d region to a higher binding energy by ~1 eV, neither of which was found. Likely, in the inherently reductive environment of CNT growth, such a reaction between oxides would be inhibited. Similarly in the $ZrO_2$—$Al_2O_3$ system, only a mixture of the separate oxides (i.e., no phase transition) is expected at both 750° C. and 900° C. (up to 1150° C.).

Figure 4A:
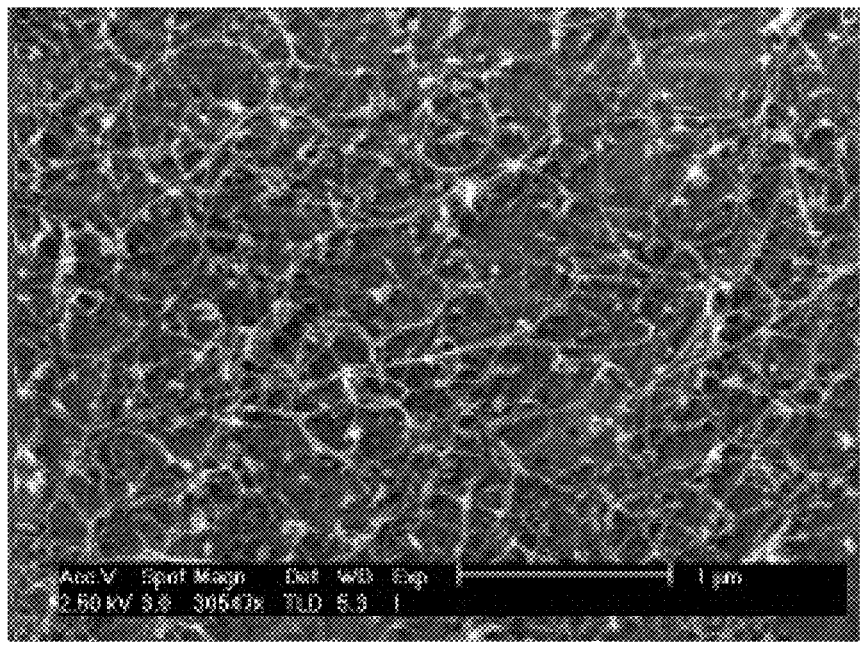
FIGS. 4A-4B include, according to one set of embodiments, (A) an SEM image of CNTs grown using zirconia on a Si wafer with 10 nm alumina support, analyzed by XPS in situ during CVD, and (B) CNTs grown atop a platelet of zirconia on a silicon wafer during in situ XPS analysis.
Figure 4B:
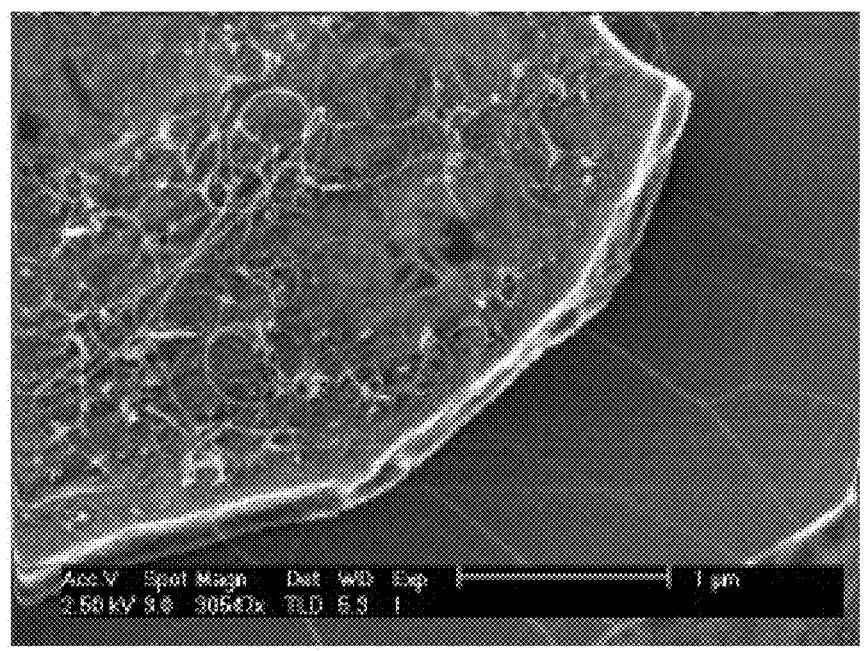
Figure 5:
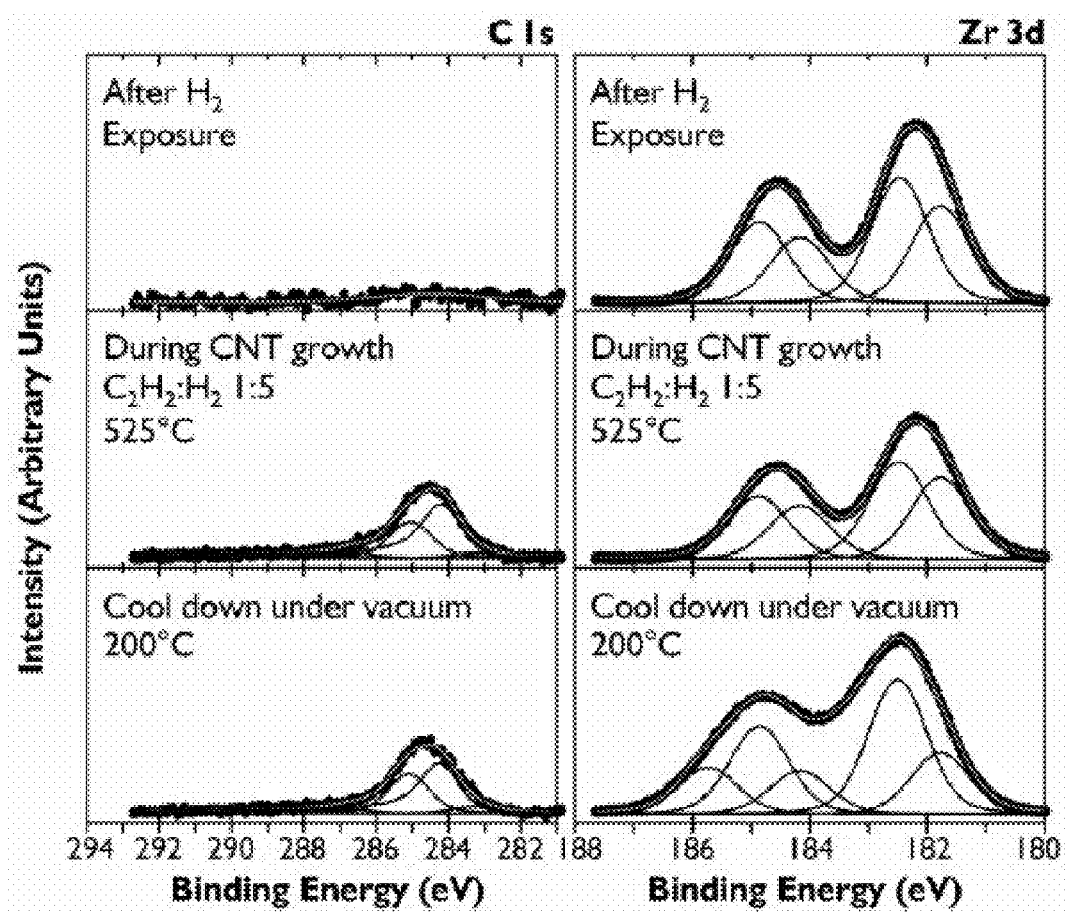
FIG. 5 includes, according to one set of embodiments, progressive XPS measurements of the C 1s and Zr 3d regions during growth of CNTs from zirconia on a silicon substrate.

To verify the hypothesis that zirconia itself was serving as the CNT growth nanopositor, in situ XPS analysis of low-pressure CVD growth of CNTs from $ZrO_2$ was performed. FIGS. 4A-4B show SEM images of CNTs grown from $ZrO_2$ on a Si substrate from this experiment. A substantial yield of CNTs was observed within the XPS analysis area by SEM, easily identifiable atop platelets of zirconia on the substrate surface. FIG. 5 shows the progression of the C 1s and Zr 3d regions of the XPS spectra from this sample after heating in hydrogen, during growth with acetylene and $H_2$, and after CVD during cooldown in vacuum. Prior to introduction of hydrogen (not shown), a high-binding energy chemistry of Zr centered at 182.6 eV was initially observed, corresponding to the presence of electron-withdrawing oxychloride and alkoxide on the surface. Upon introduction of hydrogen, the Zr 3d signal shifted to a lower binding energy, corresponding to formation of zirconia. Two pairs of spin-orbit-split peaks corresponding to two phases of zirconia can be resolved, one phase with the Zr $3d_{5/2}$ peak at 182.5 eV and one with the Zr $3d_{5/2}$ peak at 181.8 eV. The lower binding energy signal was attributed to an oxygen-deficient phase of zirconia, while the higher binding energy signal was attributed to stoichiometric $ZrO_2$.

Thus it appeared that introduction of $H_2$ did not reduce the deposited zirconia film to Zr metal, but instead pulled off residual chloride and alkoxide groups to yield oxide phases. Subsequent introduction of acetylene invoked an additional temporary, low-lying, high-binding energy signal attributed to a charging effect (also not shown). This signal disappeared and only signals corresponding to two phases of zirconia persisted throughout the CVD growth. Upon addition of hydrogen to the acetylene stream, a C 1s peak emerged, which may be attributed to nucleation of CNTs and possibly formation of other carbonaceous structures. This peak resolved into several components observed in CNT growth from other nanopositors along with a low binding energy component located at 283.4 eV. This peak did not match the expected position for the C 1s peak of zirconium carbide (282 eV). Not wishing to be bound by any theory, this may have been caused by the interaction of a deposited organic with the support. Finally upon cool-down, only the two phases of zirconia observed during growth remained, along with a high binding energy signal attributed to charging effects. At no point prior, during, or after CVD growth of CNTs was metallic zirconium (binding energy 178.6-179.6 eV) or zirconium carbide (binding energy 179-181.1 eV) observed in the Zr 3d region. Thus one may conclude that the CNT growth nanopositor was the oxide zirconia. Null CNT growth on zirconia-free Si substrates coated with alumina suggested that the 10-nm alumina support layer did not serve as the nanopositor.

Notably, the C 1s peak in the in situ XPS spectrum of the Si substrate did not appear immediately following introduction of acetylene, but only after hydrogen was added as well. Not wishing to be bound by any theory, the introduction of hydrogen may have aided in transformation of acetylene into other organic precursors that could then be taken up and transformed into CNTs and/or other solid forms of carbon by zirconia. Perhaps common metallic CNT nanopositors, such as Fe and Ni, are able to catalyze this hydrocarbon digestive process directly, which may explain why zirconia gave lower areal yields of CNTs.

We note that time-resolved, in situ XPS provides accurate information about the chemical state of the nanopositor during CNT growth at that moment. Nevertheless, the question arises as to whether or not the active species during growth might be missed by XPS due to detection limits of species present in small quantities or because of short, transient changes in the state of a species on a time scale faster than the acquisition time. However, it may be argued that if such short and/or small atomic fraction processes do arise and result in traces of metallic or carbidic Zr, these traces would have been detectable at some point in the analysis, as reduced Zr would not reoxidize in a vacuum and should not only remain detectable but accumulate and become more detectable with time.

Figure 6A:
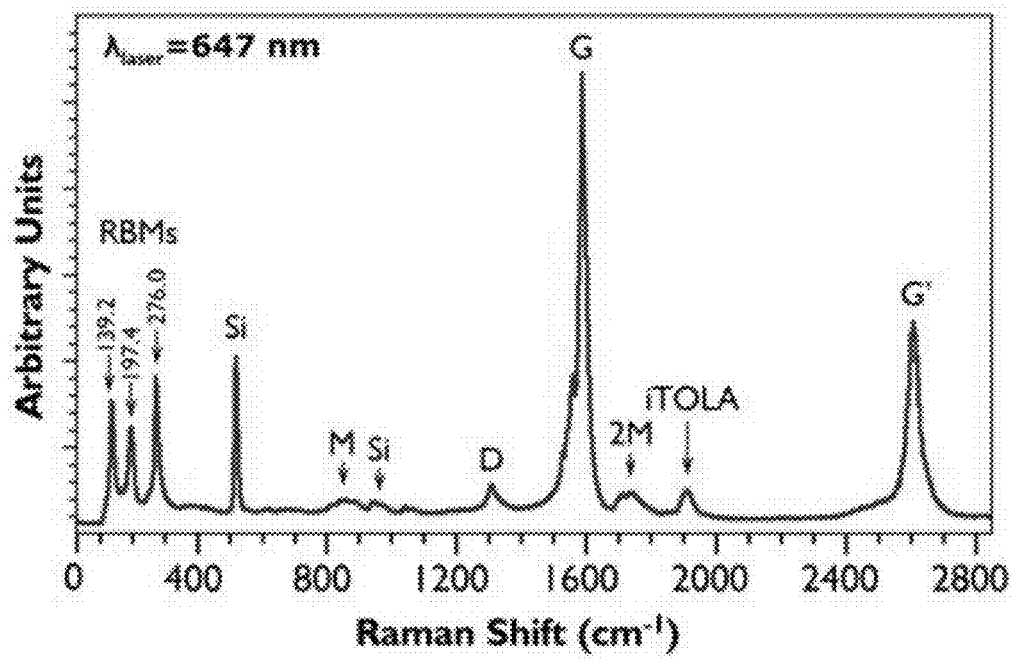
FIGS. 6A-6B include (A) a Raman spectrum from carbon nanotubes grown by CVD during in situ XPS analysis and (B) a magnified view of the spectrum in FIG. 6A from about 80 to about 360 cm$^{-1}$, according to one set of embodiments.
Figure 6B:
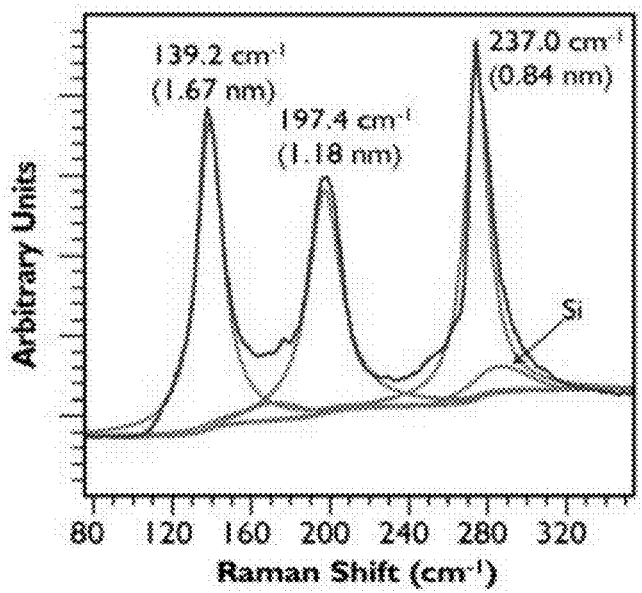

Raman spectroscopy was performed on the Si substrates used for the in situ XPS growth to assess the type and quality of CNTs that resulted from the growth. Radial breathing modes between 130 to 280 cm$^{-1}$ were observed within the XPS analysis area, indicating the presence of SWNTs (see FIG. 6). For an individual nanotube on an Si/SiO$_2$ substrate, the diameter of the nanotube in resonance with the laser can be approximated by $d_t$ [nm]=233 cm$^{-1}$%/$\omega_{RBM}$. For the spectrum shown in FIG. 6, nanotubes of 1.67 nm, 1.18 nm, and 0.84 nm were observed. The low D-to-G ratio suggested the presence of high-quality, low-defect CNTs. Raman peaks from zirconia were not readily observable relative to carbon Raman peaks where CNTs were best resolved.

Figures 7A, 7B:
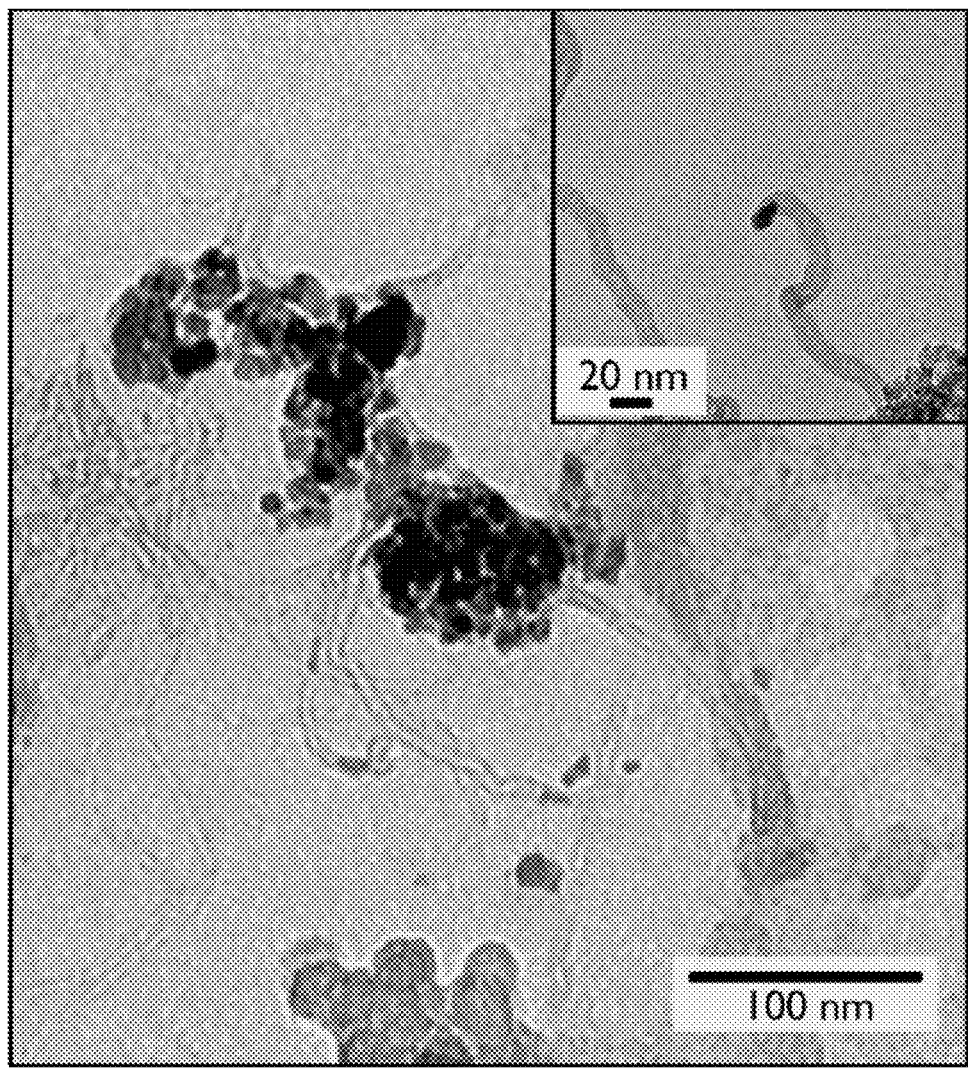
FIGS. 7A-7D include (A) an exemplary TEM image of CNTs attached to zirconia nanopositor nanoparticles from in situ XPS growth experiments; (B) an exemplary TEM image of a CNT attached to a zirconia nanopositor nanoparticle grown from zirconia-doped carbon aerogel; (C) an exemplary scanning TEM (STEM) image of CNTs extending from zirconia nanoparticles grown during in situ XPS experiments; and (D) an exemplary point-localized EDAX spectrum of a nanoparticle (circled) attached to CNTs from in situ XPS experiment, verifying a particle composition of ~$ZrO_2$, according to one set of embodiments.
Figure 7C:
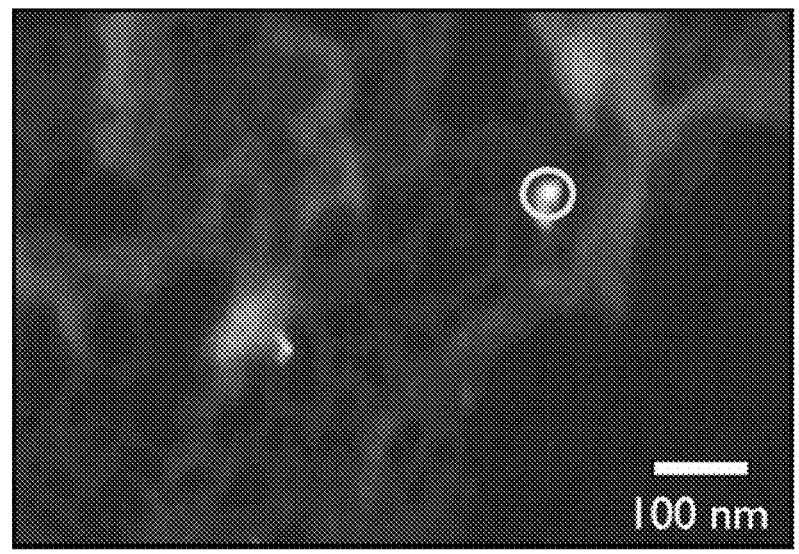
Figure 7D:
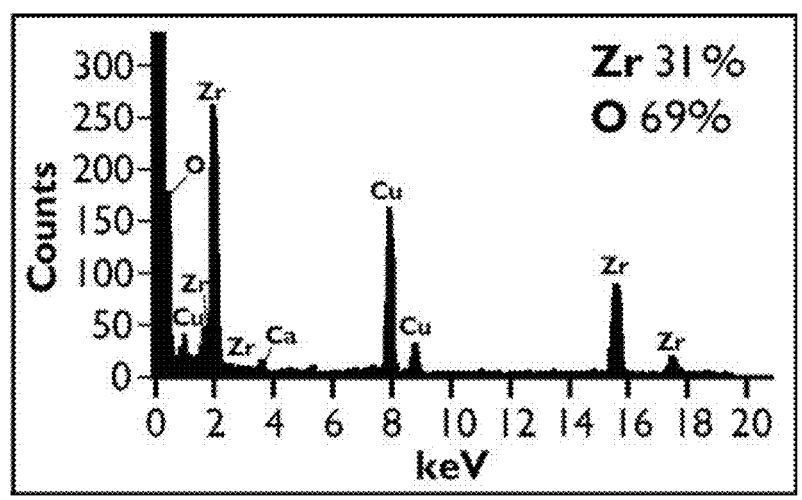

CNTs grown from zirconia nanoparticles during in situ XPS analysis were transferred onto TEM grids (Cu with C film) to verify that the XPS measurements were representative of particles at the nanoscale and that zirconia nanoparticles were the nanopositor responsible for CNT growth. FIGS. 7A-7C include TEM images showing CNTs attached to zirconia nanoparticles. To further prove that the observed particles were zirconia, rather than zirconium metal, scanning transmission electron microscopy (STEM) was performed and point-localized energy-dispersive X-ray spectroscopy (EDAX) was used to characterize the elemental composition of the nanopositor. EDAX revealed a stoichiometry of about 30% Zr and about 70% O for the nanopositor nanoparticles (See FIG. 7D), suggesting a stoichiometry of ZrO$_2$ and further suggesting that the in situ and ex situ XPS and XRD characterizations were representative of the nanoscale. Multiple particles attached to multiple CNTs exhibited similar stoichiometry. The ratio of oxygen to zirconium measured was consistent from particle to particle within ±5%. and was not contributed by the grid or other structures on the grid, as evidenced by EDAX spectra collected away from the particles of interest.

To better understand the interactions of nanoparticulate zirconia in the presence of carbon at elevated temperatures, zirconia nanoparticle-doped carbon aerogels were studied. A nanoparticle-doped carbon aerogel system offers several benefits for studying the interactions of nanoparticles of a material with carbon. First, it allows for synthesis of a bulk quantity of nanoparticles dispersed inside an amorphous carbon matrix for a wide range of nanoparticle compositions. Second, because the aerogel materials are macroscopic, three-dimensional monoliths, both bulk characterization techniques like XRD, which can be challenging to use for surface-bound particles, as well as surface analysis techniques like XPS can be used to characterize the nanoparticles of interest. Furthermore, the materials can be pyrolyzed over a wide range of temperatures, allowing for investigation of temperature dependency on the nanoparticle-carbon interactions.

Aerogels were prepared using an adapted version of the ion exchange technique used to prepare metal-doped carbon aerogels. Metal-doped carbon aerogels prepared through ion exchange (as described in Steiner et al., incorporated above) typically exhibit a "blueberry muffin" morphology in which metal-containing nanoparticles ("blueberries") are dispersed throughout a low-density mesoporous amorphous carbon framework ("muffin"). In the case of Fe- and Cu-doped carbon aerogels, this carbon framework is essentially the same as in undoped carbon aerogels for pyrolysis temperatures up to 1050° C. During pyrolysis, the resorcinol-formaldehyde-type polymer framework of the aerogel can dehydrate to afford amorphous carbon. Simultaneously, metal ions attached to the polymer framework can be reduced and can coarsen into a spectrum of metal-containing nanoparticles with a range of diameters and, depending on the metal, a range of crystallite phase and surface compositions. In similarly-prepared Ni- and Co-doped carbon aerogels, however, graphitic nanoribbons surrounding metal nanoparticles can be observed amongst an otherwise amorphous carbon matrix. In these materials the Ni and Co nanoparticles, which are both solvents for carbon, can catalyze a solid-state transformation of the amorphous carbon into graphitic nanoribbons and other graphitic nanostructures.

Figure 8:
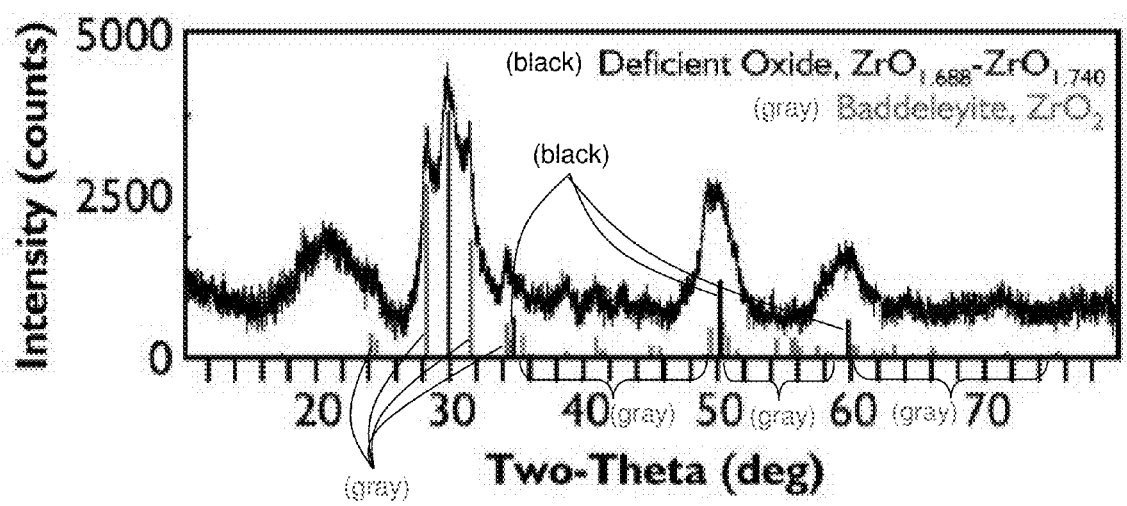
FIG. 8 includes, according to one set of embodiments, a powder XRD pattern of zirconia-doped carbon aerogels with possible phase matching corresponding to baddeleyite zirconia (gray lines) and an oxygen-deficient phase of zirconia (black lines)

The same ion exchange process used to prepare metal-doped carbon aerogels was used to prepare ZrO$_2$-doped carbon aerogels, only employing ZrOCl$_2$ as the ion exchange salt. Based on results from the Fe-doped carbon aerogel system, carbon aerogels with an amorphous carbon structure laced with metallic zirconium and/or zirconium carbide nanoparticles were initially expected. But consistent with our observations of the irreducibility of zirconyl beyond oxygen-deficient zirconia during CNT growth, carbon aerogels laced with zirconia (ZrO$_2$) nanoparticles resulted instead. XRD of the ZrO$_2$-doped carbon aerogels (see FIG. 8) shows the presence of crystallites of zirconia in these materials. The diffraction pattern was phase matched to an oxygen-deficient phase of zirconia (with stoichiometry ranging from ZrO$_{1.688}$-ZrO$_{1.740}$) superimposed over monoclinic baddeleyite zirconia (with stoichiometry ZrO$_2$). The broad peak widths observed indicate the mean zirconia crystallite size is in the nanometer range, and, using the Scherrer equation d=0.9$\lambda$/B cos($\theta$) to relate peak full-width at half-maximum values to crystallite size, an average crystallite size of about 7 nm was calculated. No peaks associated with Zr or ZrC were observed. In addition, the broad peak centered about 21° 2-$\theta$ was associated with the carbon component of the aerogel and is typical of carbon aerogels.

Figure 9:
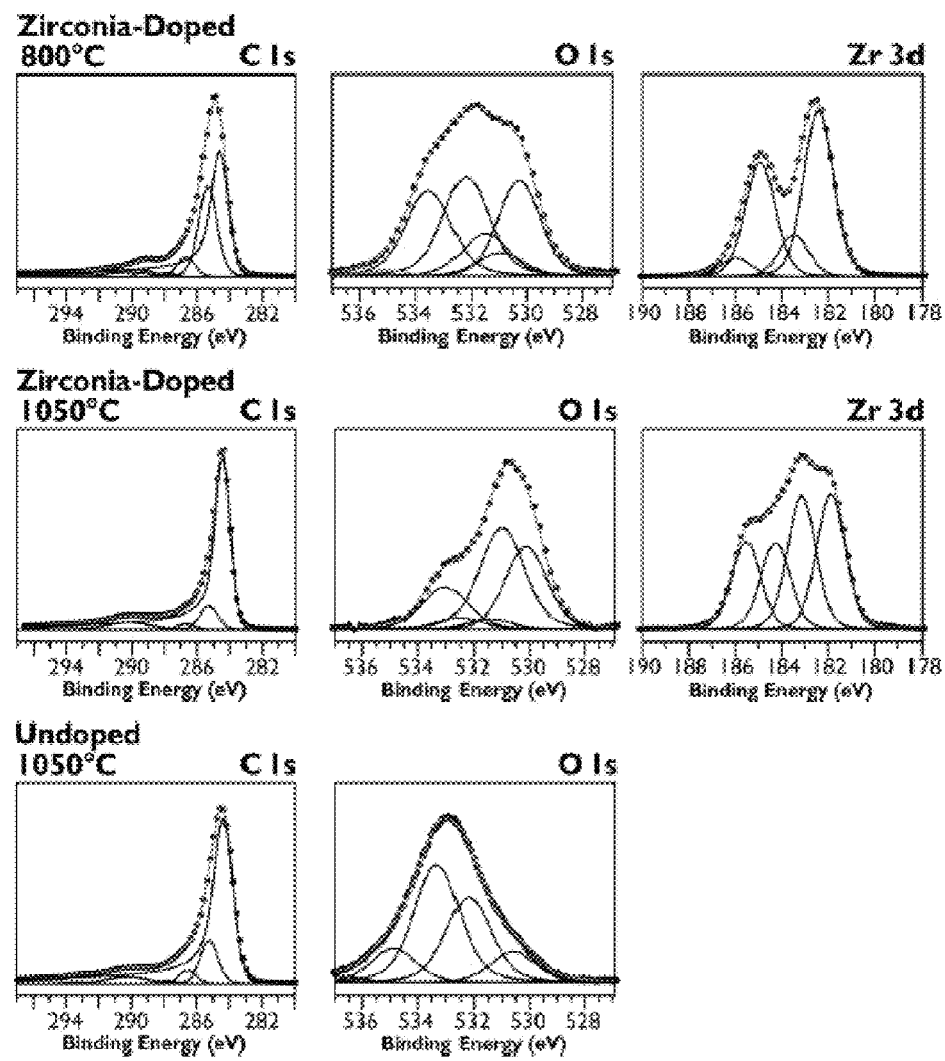
FIG. 9 includes exemplary XPS spectra of zirconia-doped carbon aerogels pyrolyzed at 800° C. (top row) and 1050° C. (middle row) and of undoped carbon aerogels pyrolyzed at 1050° C. (bottom row)

Ex situ XPS analysis of the exterior and interior surfaces of ZrO$_2$-doped carbon aerogel monoliths (see FIG. 9) showed two pairs of spin-orbit-split peaks in the Zr 3d region for samples pyrolyzed at both 800° C. and 1050° C., indicating the presence of two zirconia surface chemistries. In the sample pyrolyzed at 800° C., the Zr 3d$_{5/2}$ peak at 183.4 eV correlates to the binding energy for ZrO$_2$, whereas the Zr 3d$_{5/2}$ peak with a binding energy of 182.3 eV falls at a slightly lower binding energy than stoichiometric ZrO$_2$ and is likely an oxygen-deficient chemistry, ZrO$_{2-x}$. The lower binding energy chemistry is the dominant surface chemistry at 800° C. but gives way to a higher binding energy chemistry attributed to stoichiometric ZrO$_2$ at 1050° C., possibly due to annealing. The lower binding energy chemistry also shifts down to 181.9 eV at 1050° C., suggesting further oxygen deficiency. Not wishing to be bound by any theory, this may have been due to migration of oxygen to form stoichiometric $ZrO_2$. Zr metal (binding energy 178.6-179.6 eV) and ZrC (binding energy 178-179 eV) were not observed after 100 sweeps. The 0 1s region showed the presence of several chemistries of oxygen, including two at 530 eV and at 531 eV, which are consistent with the binding energies of oxygen in $ZrO_2$, and one at 532.8-532.9 eV, which was also seen in undoped carbon aerogels and was attributed to oxygenated surface carbon on the aerogel framework. The presence of two non-carbon aerogel oxygen chemistries and two zirconia chemistries supports the XRD pattern phase matches indicating the presence of two phases of zirconia, although there is likely a blend of substoichiometric surface oxides present in these samples. Furthermore, the low binding energy zirconia chemistries observed is consistent with the observation of an oxygen-deficient phase by XRD. The C 1s regions for both $ZrO_2$-doped carbon aerogels and undoped carbon aerogels are essentially identical, and no peak attributable to ZrC in either the C 1s region (C 1s 282 eV) or Zr 3d region (179-181.1 eV) is observed.

Observations regarding the surface and crystallographic composition of zirconia drawn from XRD and ex situ XPS of $ZrO_2$-doped carbon aerogels indicate that nanoparticulate $ZrO_2$ was not carbothermically reduced at temperatures up to 1050° C., corroborating our observations from in situ XPS during CVD growth of CNTs. Furthermore, it was unlikely that these oxide nanoparticles result from, for example, Zr or ZrC formed during pyrolysis that are oxidized upon exposure to air. Other metal-doped carbon aerogels that have been prepared (Cu, Fe, Ta, Re, and W, for example) exhibited both metallic crystallites in their XRD patterns and detectable metallic surface chemistries in their XPS spectra long after exposure to air (months) in addition to oxide surface chemistries resulting from air exposure. Zr may be less susceptible to oxidation than some of these metals, especially Fe, so if reduced Zr was formed during pyrolysis, it would be detectable by either or both XRD and ex situ XPS after exposure to air.

Figure 10:
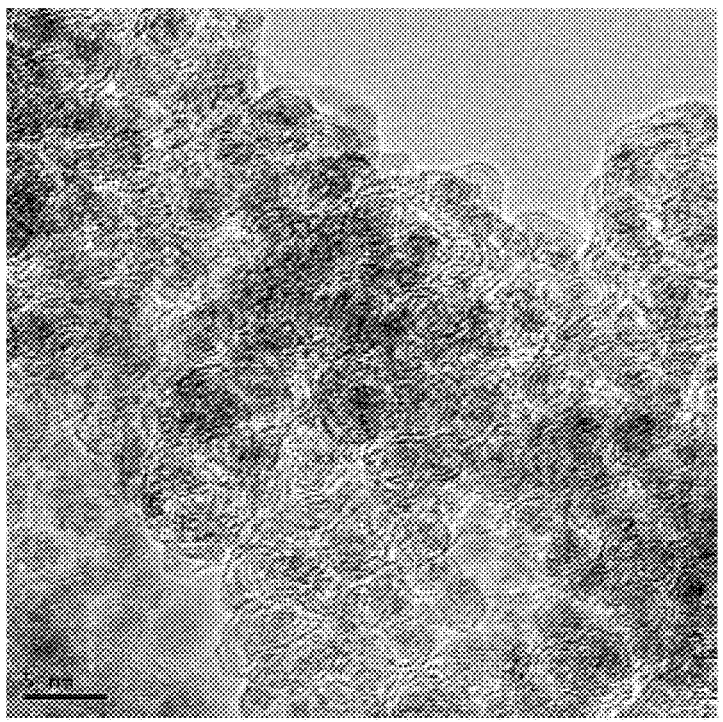
FIG. 10 includes, according to one set of embodiments, an SEM of fullerenic cage structures encasing zirconia nanoparticles in zirconia-doped carbon aerogel pyrolyzed at 800° C.

Investigation of $ZrO_2$-doped carbon aerogels under TEM, shown in FIG. 10, revealed the presence of fullerenic cage structures encapsulating $ZrO_2$ nanoparticles. These types of structures are not observed in undoped carbon aerogels. Raman spectroscopy of $ZrO_2$-doped carbon aerogels at an excitation wavelength of 514 nm showed a broad D-band and broad G-band similar to that of undoped carbon aerogels. This suggested that the fullerenic structures in the aerogel are not representative of the entire aerogel framework but rather are localized around $ZrO_2$ nanoparticles in the aerogel, which only comprise about 2.9 at. % of the aerogel structure as determined by ex situ XPS. These observations support the conclusion that zirconia can graphitize amorphous carbon.

Figure 11A:
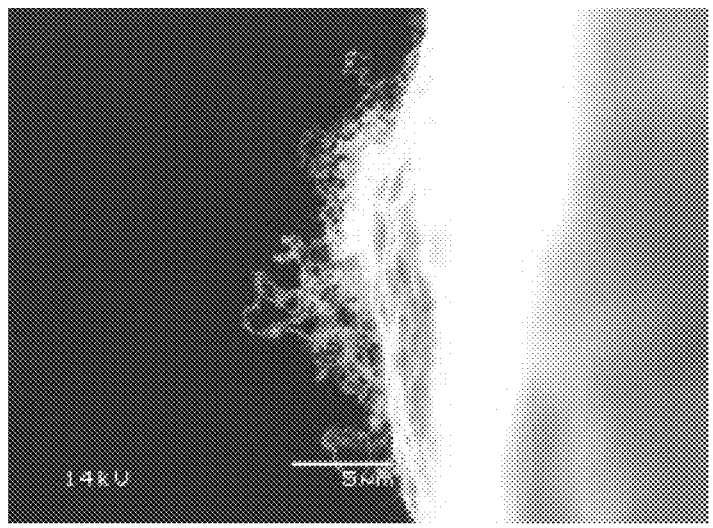
FIGS. 11A-11B include (A) an SEM image of multi-wall carbon nanotubes protruding from the surface of a zirconia-doped carbon aerogel following CVD, and (B) TEM images of MWNTs emerging from zirconia nanoparticles embedded in zirconia-doped carbon aerogel (mass of circular particles in lower left region) (scale bar=20 nm), according to one set of embodiments.
Figure 11B:
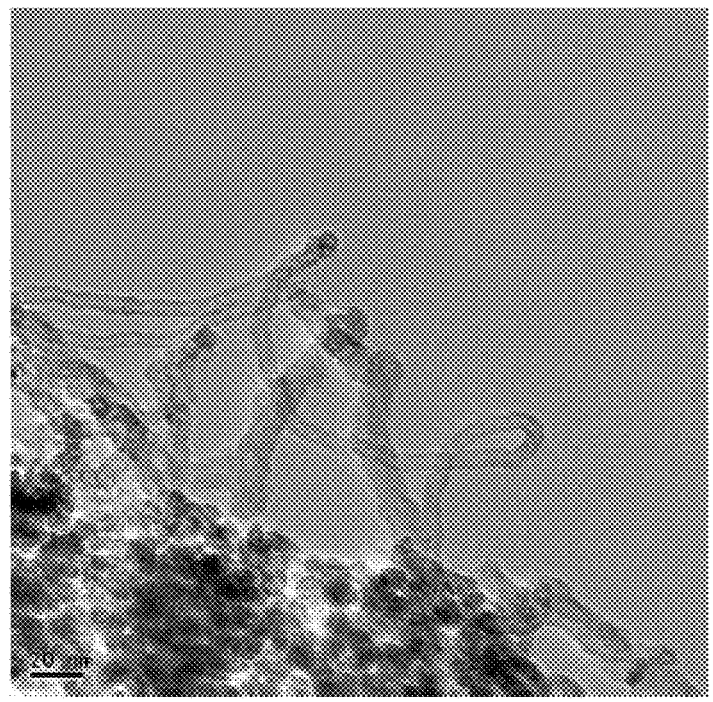

$ZrO_2$-doped carbon aerogels were then assessed for activity toward increasing the growth of CNTs via thermal CVD using ethylene feedstock at 700-750° C. Tangled bundles of CNTs were observed covering the exterior surfaces of the $ZrO_2$-doped carbon aerogel monolith, as shown in FIGS. 11A-11B. TEM of CVD-processed $ZrO_2$-doped carbon aerogels verified the observed structures were in fact MWNTs (FIG. 11B). The MWNTs were found extending from zirconia nanoparticles in the carbon aerogel skeleton under TEM. No CNTs were observed on undoped carbon aerogels after processing with the same CVD growth conditions. These observations again suggested that the zirconia particles were serving as the CNT growth nanopositor. Post-CVD XPS analysis of $ZrO_2$-doped carbon aerogels revealed no detectable change in zirconium surface chemistry due to CNT growth, again consistent with the expectation that zirconia would not be reduced by hydrogen or carbon at the CNT growth temperatures. In situ XPS analysis of zirconia-doped carbon aerogels during CVD growth conditions further verified the absence of any metallic zirconium or zirconium carbide. Thus, one may conclude that the zirconia nanoparticles in the carbon aerogel were not reduced by the CVD growth process or from carbothermic reduction by the surrounding amorphous carbon, and served as CNT nanopositors in an oxide state. CNT yield on $ZrO_2$-doped carbon aerogels pyrolyzed at 1050° C. was noticeably lower than on aerogels pyrolyzed at 800° C. This finding suggests that the oxygen-deficient zirconia, which is more prevalent in aerogels pyrolyzed at 800° C., may be preferable for enabling CNT growth.

Figure 12A:
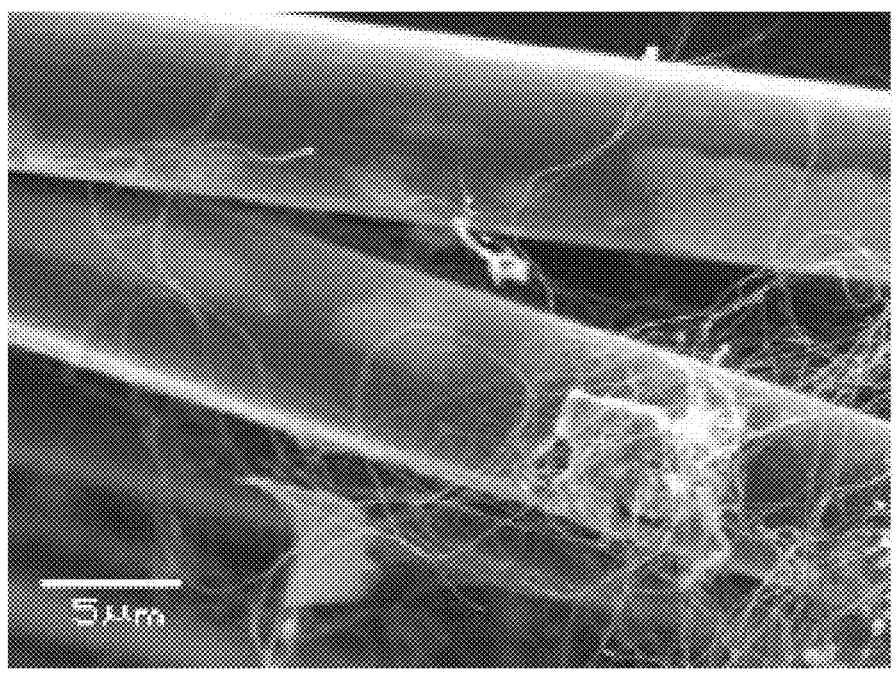
FIGS. 12A-12B include, according to one set of embodiments, SEM images of long CNTs, CNT bundles, and large diameter fibrils extending from a carbon fiber coated with zirconia nanoparticles produced by dip-coating in $ZrOCl_2$ solution followed by $H_2$ reduction.
Figure 12B:
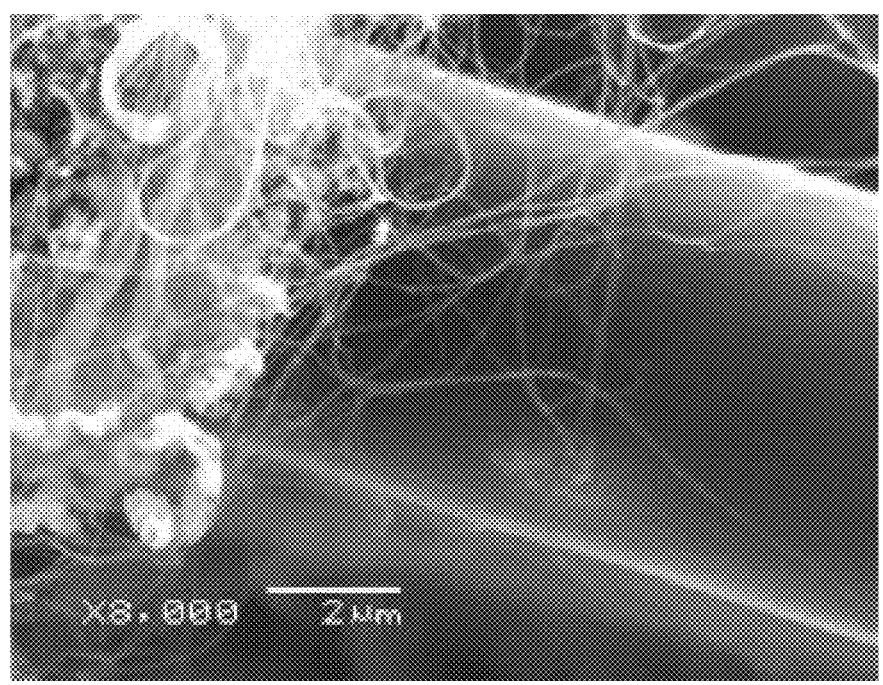

Following the growth of CNTs from $ZrO_2$-doped carbon aerogels, CVD growth using zirconia on another carbon substrate, carbon fibers, was undertaken. Fiber tows were dip-coated with saturated $ZrOCl_2$ in 2-propanol solution, heated under $H_2$ to the growth temperature, and processed using CVD with ethylene as the feedstock gas as was done for the $ZrO_2$-doped carbon aerogels. Growth of CNTs was observed on the fibers following CVD, as shown in FIGS. 12A-12B. No pitting or other damage to the carbon fiber was observed (as is the case when CNTs are grown on carbon fibers dip-coated with solutions of iron salts). This performance suggests that zirconia can be used as a nanopositor for nanostructure growth when using substrates (e.g., carbon) that react with metals at nanostructure growth temperatures (e.g., temperature for carbon nanotube growth).

Not wishing to be bound by any particular theory, the high melting point of bulk $ZrO_2$ makes it unlikely that nanoscale $ZrO_2$ exists in a molten state at the CVD growth temperatures used here, even after factoring in particle size effects. Additionally, given the low diffusivity of C in bulk $ZrO_2$, the successful growth of CNTs and graphitic nanoshells by $ZrO_2$ suggests CNT growth occurs by a surface-borne mechanism. Not wishing to be bound by any particular theory, zirconium oxide, like iron, may catalyze reactions of organic molecules on its surface that aid in the assembly of the nanotube/nanoshell structure, although zirconium oxide may involve different intermediates and bonding configurations than Fe and other metals.

Example 2

This example describes the production of prefabricated monodisperse high-purity zirconia nanoparticle nanopositors and the growth of carbon nanotubes (CNTs) from the zirconia nanoparticle nanopositors.

Nanoparticle Synthesis

Figure 13:
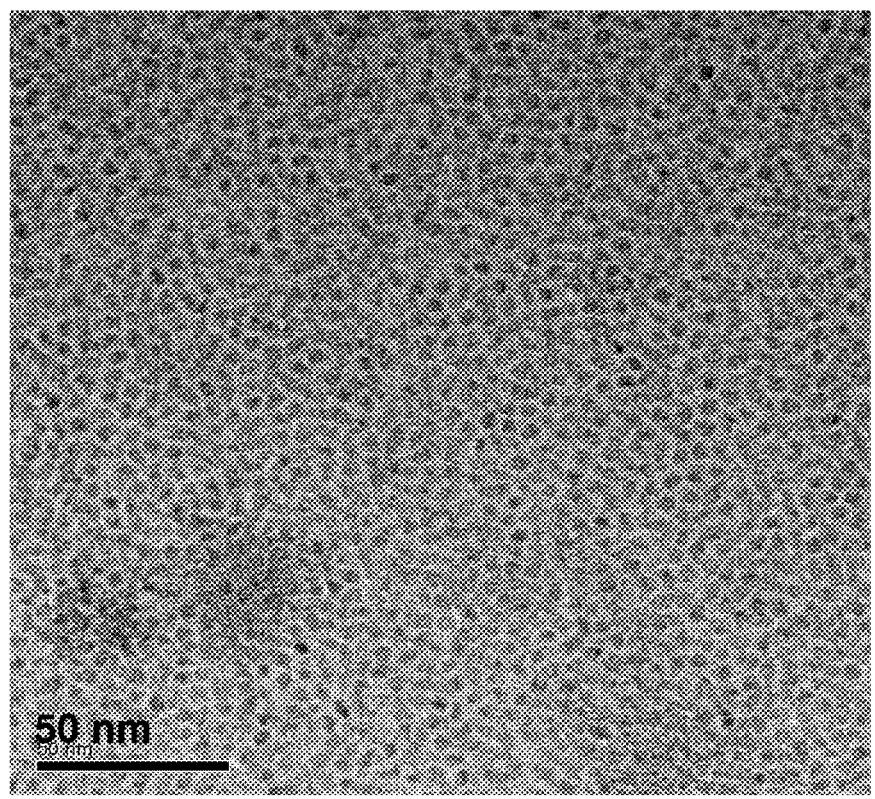
FIG. 13 includes an exemplary HRTEM image of zirconia nanoparticle nanopositors, according to some embodiments.

Monodisperse zirconia nanoparticles were prepared according to the method of Joo et al., described elsewhere (see *Journal of the American Chemical Society*, 2003, 125, 6553-6557). Briefly, zirconium isopropoxide propanol complex and zirconium tetrachloride were added to redistilled, degassed trioctylphosphine oxide (TOPO) at 60° C. The reaction mixture was slowly raised to 340° C. and held at this temperature for 2 hours with vigorous stirring. The reaction mixture was then cooled to 60° C., at which dried, degassed acetone was added to precipitate the resulting zirconia nanoparticles. HRTEM characterization of nanoparticles prepared through this technique and used for CNT growth revealed a highly uniform particle size distribution with an average particle diameter of about 4 to 5 nm. FIG. 13 shows HRTEM images of zirconia nanoparticles used to grow CNTs prior to CNT growth. Dry, precipitated zirconia nanoparticles were added to 2-propanol, n-pentane, or toluene to produce solutions of various concentrations (0.005 mg/mL, 0.05 mg/mL, 0.5 mg/mL, and 5 mg/mL), and the solutions were stirred. The solutions were sonicated for 3 min to better disperse the particles. The resulting solutions were then applied to silicon wafers with a 200-nm silicon oxide or 10-nm aluminum oxide on 200-nm silicon oxide support.

Application of Nanoparticles to Substrates

Solutions of nanoparticles were applied through drop-casting, spin-coating, or dip-coating. In the case of drop-casting, 1-2 drops of solution were dropped onto the wafer surface from a long glass Pasteur pipette and either allowed to dry evaporatively in air or dried quickly with the aid of a gentle flow of $N_2$. In the case of spin-coating, the target wafer was spun to 2500 rpm at which point 1-2 drops of solution were dropped onto the wafer from a Pasteur pipette. The wafer was allowed to spin for approximately 1 min after application of the solution. For dip-coated samples, a wafer was inserted into the desired solution, retracted over the course of 1 s, and dried with a flow of $N_2$.

Nanoparticle films were prepared through the Langmuir-Blodgett method. Briefly, a solution of 0.5 mg/mL 4-nm zirconia nanoparticles in toluene was pipetted onto a layer of water in a beaker such that toluene covered the entire surface of the water. The toluene was then controllably evaporated using a gentle flow of $N_2$ causing the hydrophobic zirconia nanoparticles to precipitate into a film. The floating films were then captured onto silicon wafers by scooping the wafer under the film and slowly pulling the wafer up out of the solution as to retain the film on the wafer surface. The film then adhered to the substrate surface. The film-coated wafer was then dried with a flow of $N_2$.

CVD Growth of Carbon Nanotubes

CVD growth of CNTs was performed under various conditions. In one set of conditions, samples were heated to 750° C. under a flow of $H_2$ and He in a 1" quartz process tube at which point a flow of $C_2H_4$ was added for 30 min. The $C_2H_4$ and $H_2$ were then removed and the samples were allowed to cool to ambient conditions. In another set of conditions, $C_2H_2$ was used as the feedstock. In yet another set of conditions, the samples were heated to 900° C. and $CH_4$ was used as the feedstock. In yet another set of conditions, samples were placed inside of a vacuum chamber evacuated to $10^{-2}$ torr and heated to ~650° C. with a graphite substrate heater, and $C_2H_2$ used as the feedstock. In all cases, CNT growth was observed on the substrates following CVD processing as verified by SEM, TEM, AFM, and Raman spectroscopy.

Figure 14A:
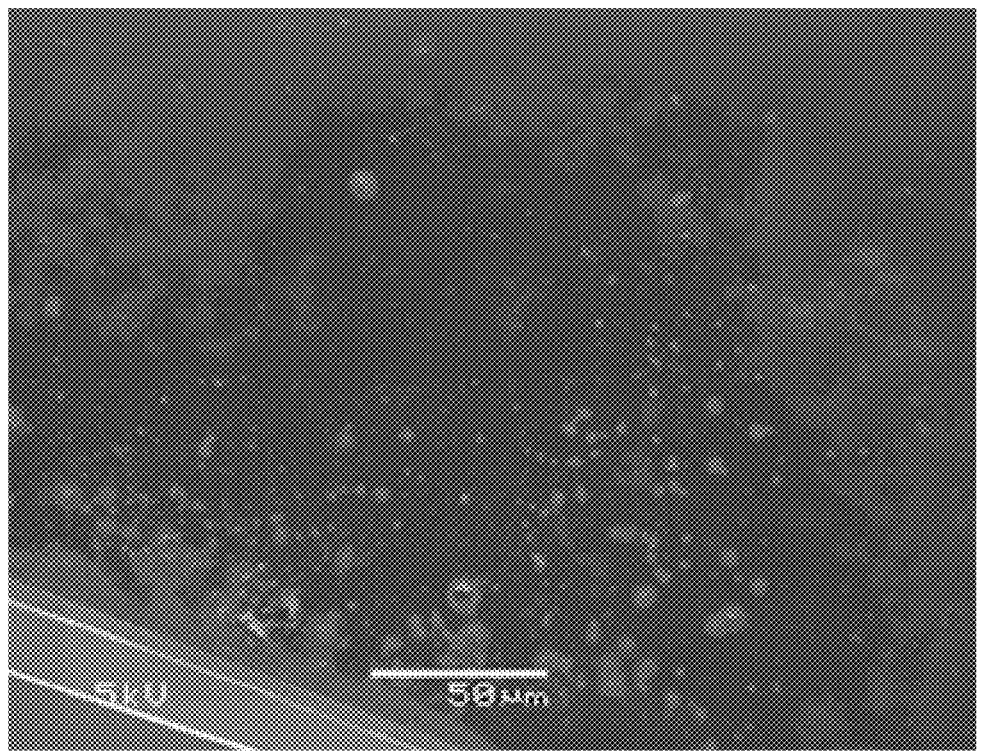
FIGS. 14A-14B include, according to some embodiments, exemplary SEM images showing carbon nanotube growth from zirconia nanoparticle nanopositors.
Figure 14B:
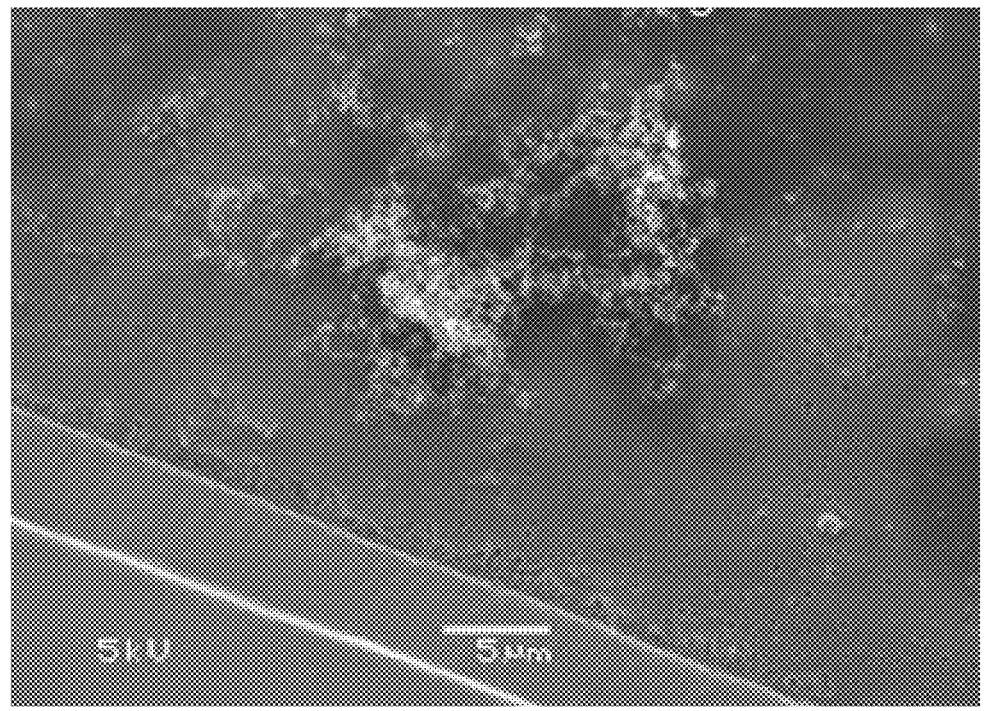
Figure 15:
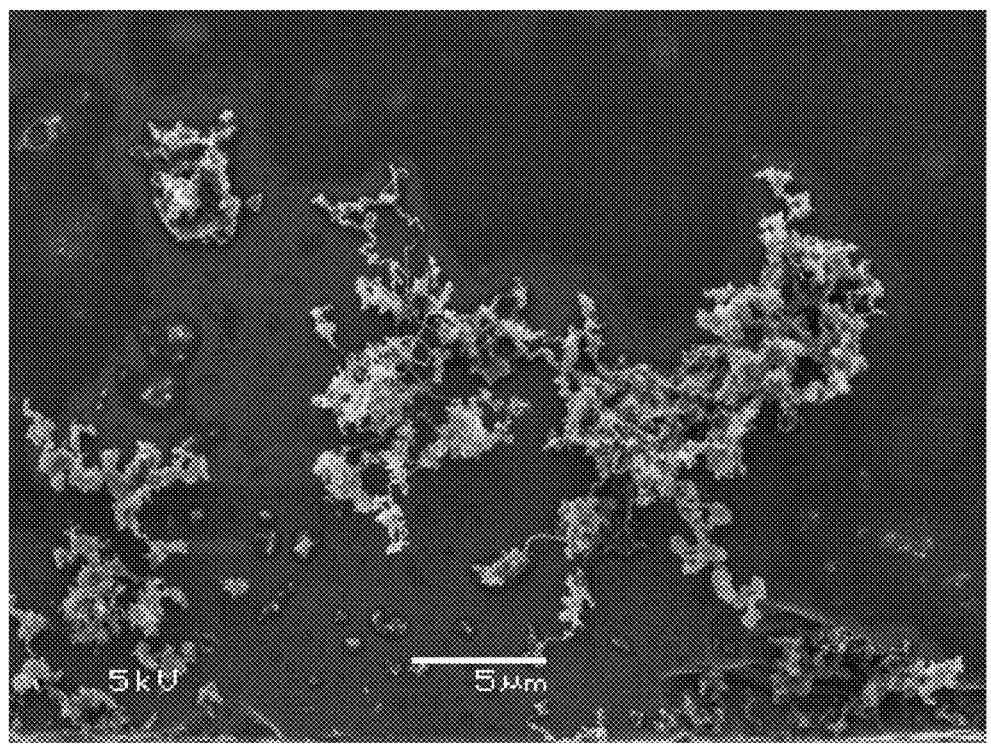
FIG. 15 includes an exemplary SEM image showing carbon nanotube growth from zirconia nanoparticle nanopositors, according to one set of embodiments.

FIGS. 14A-14B show SEM images of CNTs grown with zirconia nanoparticle nanopositors drop-cast from 2-propanol and processed with atmospheric CVD with $C_2H_4$. FIG. 15 shows an SEM image of CNTs growth with zirconia nanoparticle nanopositors drop-cast from pentane and processed with the same conditions. Similar results were observed for other solvents, nanoparticle deposition methods, and CVD conditions. The successful growth of CNTs with high-purity, well-characterized zirconia nanoparticles with stringent sample preparation conditions under a wide range of CVD conditions and using various CVD tools verifies the effectiveness and versatility of the approach.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of growing carbon nanotubes, comprising:
exposing a carbon nanotube precursor to a nanopositor comprising a zirconium oxide under conditions causing the formation of carbon nanotubes directly on the zirconium oxide.

2. The method of claim 1, wherein fewer than about 2% of the zirconium atoms in the zirconium oxide are reduced to a zero oxidation state during the formation of the carbon nanotubes.

3. The method of claim 1, wherein fewer than about 2% of the zirconium atoms in the zirconium oxide form a zirconium carbide during the formation of the carbon nanotubes.

4. The method of claim 1, wherein the zirconium oxide has an oxygen to zirconium ratio ranging from about 1.0 to about 2.0.

5. The method of claim 1, wherein the precursor material comprises at least one of a hydrocarbon and an alcohol.

6. The method of claim 1, wherein the set of conditions comprises a pressure substantially equal to or less than about 1 atmosphere.

7. The method of claim 1, wherein the set of conditions comprises a temperature between about 300-1100° C.

8. The method of claim 1, wherein the nanopositor comprises a dopant.

9. The method of claim 8, wherein the dopant comprises at least one of Ca, Mg, Sr, Ba, Y, and Mo.

10. The method of claim 8, wherein the nanopositor comprises between about 0.1 atomic % and about 5 atomic % calcium.

11. The method of claim 1, wherein fewer than about 1% of the zirconium atoms in the zirconium oxide are reduced to a zero oxidation state during the formation of the carbon nanotubes.

12. The method of claim 1, wherein fewer than about 0.1% of the zirconium atoms in the zirconium oxide are reduced to a zero oxidation state during the formation of the carbon nanotubes.

13. The method of claim 1, wherein substantially none of the zirconium atoms in the zirconium oxide are reduced to a zero oxidation state during the formation of the carbon nanotubes.

14. The method of claim 1, wherein fewer than about 1% of the zirconium atoms in the zirconium oxide form a zirconium carbide during the formation of the carbon nanotubes.

15. The method of claim 1, wherein fewer than about 0.1% of the zirconium atoms in the zirconium oxide form a zirconium carbide during the formation of the carbon nanotubes.

16. The method of claim 1, wherein substantially none of the zirconium atoms in the zirconium oxide form a zirconium carbide during the formation of the carbon nanotubes.

17. The method of claim 1, wherein the zirconium oxide has an oxygen to zirconium ratio ranging from about 1.6 to about 2.0.

18. The method of claim 1, wherein the zirconium oxide comprises $ZrO_2$.

19. The method of claim 1, wherein the nanopositor is in contact with a growth substrate.

20. The method of claim 1, wherein the exposing step comprises exposing the nanopositor to a carbon nanotube precursor material such that the precursor material contacts the nanopositor.

21. The method of claim 1, wherein the set of conditions comprises a temperature between about 500-900° C.

* * * * *